US012129011B2

(12) United States Patent
 Creagh

(10) Patent No.: US 12,129,011 B2
(45) Date of Patent: Oct. 29, 2024

(54) ARMED UNMANNED AERIAL VEHICLE AND METHODS OF USE THEREOF

(71) Applicant: Skyborne Technologies Pty. Ltd., Queensland (AU)

(72) Inventor: Michael Creagh, Queensland (AU)

(73) Assignee: Skyborne Technologies Pty. Ltd., Queensland (AU)

(*) Notice: Subject to any disclaimer, the term of this patent is extended or adjusted under 35 U.S.C. 154(b) by 278 days.

(21) Appl. No.: 17/637,243

(22) PCT Filed: Sep. 7, 2020

(86) PCT No.: PCT/AU2020/050942
§ 371 (c)(1),
(2) Date: Feb. 22, 2022

(87) PCT Pub. No.: WO2021/046592
PCT Pub. Date: Mar. 18, 2021

(65) Prior Publication Data
US 2022/0340275 A1 Oct. 27, 2022

(30) Foreign Application Priority Data
Sep. 11, 2019 (AU) .............................. 2019903381

(51) Int. Cl.
*B64C 27/22* (2006.01)
*B64D 7/00* (2006.01)
(Continued)

(52) U.S. Cl.
CPC ............... *B64C 27/22* (2013.01); *B64D 7/00* (2013.01); *F41G 3/22* (2013.01); *G05D 1/0016* (2013.01);
(Continued)

(58) Field of Classification Search
None
See application file for complete search history.

(56) References Cited

U.S. PATENT DOCUMENTS 10,370,122 B2 * 8/2019 Fisher ..................... B60L 53/00
10,486,809 B2 * 11/2019 Hupp .................. G05D 1/0016
(Continued)

FOREIGN PATENT DOCUMENTS

| EP | 3415423 A1 | 12/2018 |
| WO | 2014062275 A2 | 4/2014 |
| WO | 2017131823 A2 | 8/2017 |

OTHER PUBLICATIONS

Extended European Search Report for EP20862706.7, dated Jun. 30, 2023.
(Continued)

*Primary Examiner* — Reginald S Tillman, Jr.
(74) *Attorney, Agent, or Firm* — Hinckley, Allen & Snyder, LLP; Stephen Holmes

(57) ABSTRACT

The present invention relates to an armed unmanned aerial vehicle ("UAV"), an armed UAV control system, and methods of use thereof. In one form, the armed UAV includes: an elongate body, a pair opposed side rotor arm assemblies extending from the sides of the body, a tail rotor arm assembly extending from a rear end of the body, a weapons system including at least one firearm associated with the body, and a flight and targeting controller operatively associated with the side rotor arm assemblies and the tail rotor arm assembly. The controller configured to: determine at least a pitch angle and yaw angle required to strike a target with the weapons system, based on target information received; and selectively control operation of each rotor arm assembly for aiming the weapons system, based on at least the pitch angle and the yaw angle determined.

20 Claims, 10 Drawing Sheets

(51) Int. Cl.
  *B64U 101/15* (2023.01)
  *F41G 3/22* (2006.01)
  *G05D 1/00* (2024.01)
(52) U.S. Cl.
  CPC ......... *G05D 1/0022* (2013.01); *G05D 1/0094* (2013.01); *B64U 2101/15* (2023.01); *B64U 2201/20* (2023.01)

(56) References Cited

U.S. PATENT DOCUMENTS

2017/0073070 A1* 3/2017 Xing .................. B64D 7/00
2017/0351270 A1   12/2017 Luszcz et al.
2018/0162527 A1    6/2018 Hupp et al.
2019/0367169 A1* 12/2019 O'Leary .............. B64U 60/50

OTHER PUBLICATIONS

Development of UGS Tilt-Rotor Surveillance Tricopter UAV, Enya et al, Journal of Applied Science and Engineering, vol. 18, No. 2, pp. 177-186 (2015).
Israeli Military Veterans Built a Sniper Drone, Hsu, Jeremy, Discover Magazine, Nov. 28, 2022.

* cited by examiner

ARMED UNMANNED AERIAL VEHICLE AND METHODS OF USE THEREOF

TECHNICAL FIELD

The present invention relates to an armed unmanned aerial vehicle ("UAV"), an armed UAV control system, and methods of use thereof.

BACKGROUND

A loitering munition, also known as a suicide drone, is a weapon system category in which the munition loiters around a target area for a period of time, searches for targets and attacks once a target is located. Loitering munitions enable faster reaction times against concealed or hidden targets that emerge for short periods of time without placing high-value platforms near the target area, and also allow more selective targeting as actual attack missions can be aborted.

However, problems in general with loitering munitions stem from the fact that they provide a self-destructive strike and hence are only useful for a one-off strike. Accordingly, loitering munitions are expensive on a cost-per-shot basis, lack the ability to be re-loaded and cannot provide a post-strike damage assessment.

Further problems with loitering munitions are that they lack operational flexibility and are relatively slow on target when compared to alternatives, such as, e.g., cruise missiles and unmanned combat aerial vehicles ("UCAVs").

UCAVs address many of the deficiencies of loitering munitions in that they are capable of being used for multiple strikes and being reloaded. However, operation of UCAVs, such as, e.g., the MQ-9 Reaper, generally require a dedicated base site for stowing, reloading and deploying the UCAVs. Further, the UCAVs usually have a dedicated control site, distinct from the base site, from where the UCAVs are under real-time human control. Accordingly, UCAVs are a costly alternative to loitering munitions and are incapable of platoon-based dismounted operation (i.e., being carried and operated by an individual).

Further problems with UCAVs are that they are generally configured to carry aircraft ordnance, such as, missiles, which have a greater effective casualty radius than other weapon systems, such as, e.g., a fire arm, and thus prone to causing civilian casualties.

Recently, UAVs have been developed that are capable of carrying a firearm, such as, e.g., the TIKAD™ developed by Duke Robotics. However, such UAVs are typically heavy and incapable of being carried by an individual, or are incapable of hovering and/or firing on both air- and ground-based targets. Further, such UAVs are usually in the form of quadcopters and therefore noisy and slow when compared to traditional alternatives, such as, loitering munitions and UCAVs.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide an armed UAV, an armed UAV control system and methods of use thereof, which may at least partially overcome at least one of the abovementioned problems or disadvantages or provide the consumer with a useful or commercial choice.

According to a first aspect of the present invention, there is provided an armed unmanned aerial vehicle ("UAV") including:
  an elongate central body having a nose and an opposed tail aligned along a longitudinal axis;
  a pair of opposed side rotor arm assemblies respectively extending from opposite sides of the central body about a pitch axis, each side rotor arm assembly being selectively rotatable relative to the central body about the pitch axis;
  a tail rotor arm assembly extending from the tail of the central body along the longitudinal axis;
  a weapons system including at least one projectile associated with the central body; and
  a flight and targeting controller operatively associated with the side rotor arm assemblies and the tail rotor arm assembly, said controller configured to:
    responsive to receiving target information about a target, determine at least a pitch angle and a yaw angle required to strike the target with the weapons system; and
    selectively control operation of each said rotor arm assembly for aiming the weapons system, based on at least the pitch angle and the yaw angle determined.

Preferably, the flight and targeting controller may further be configured to selectively control each rotor arm assembly responsive to receiving external commands for directing a flight path of the UAV, including switching between flight modes.

According to a second aspect of the present invention, there is provided an armed UAV control system including:
  the armed UAV of the first aspect;
  at least one remotely accessible server in communication with the armed UAV; and
  a remote controller in communication with the UAV and/or the at least one remotely accessible server for receiving and displaying at least positional and imaging data received from the UAV and for transmitting commands to the UAV.

According to a third aspect of the present invention, there is provided a remote controller for use or when used with controlling operation of the armed UAV of the first aspect.

Advantageously, the armed UAV of the present invention provides a new weapons category in which a projectile may be deployed from a UAV that is able to at least partially aim the projectile at ground-based targets by adjusting its flight parameters and is configured to be carried, deployed and operated by an individual. Further, the armed UAV of the present invention is relatively inexpensive to operate compared to conventional loitering munitions and UCAVs as it is able to be reloaded and does not require a dedicated base or control site. Rather, the UAV of the present invention is able to be deployed in the field to support ground based troops and, when used, is able to provide a post-strike damage assessment.

The armed UAV of the present invention may be used in many operational roles. For example and without limitation, the UAV of the present invention may be used: to provide visual cues to soldiers during operations; call upon indirect fire support and assess collateral damage; locate and where possible destroy enemy positions ahead of a ground assault; relay data; fire flash, smoke, or tear gas grenades in synchronous support with an assault in urban and counter-terrorism operation; and in riot control.

As used herein, the term "Unmanned Aerial Vehicle" or "UAV" may include any unmanned aircraft without a human pilot aboard. The UAV may be operated with varying degrees of autonomy ranging from fully autonomous to intermittently autonomous, or may be remotely controlled by a human operator.

The UAV may preferably be a rotary-wing aircraft, although it is also envisaged that the UAV may also have air foils. The UAV may be capable of moving freely within the environment with respect to six degrees of freedom (e.g., three degrees of freedom in translation and three degrees of freedom in rotation). Further, the UAV may be capable of taking off from a surface, landing on a surface, maintaining its current position and/or orientation (e.g., hovering), and/or changing its position.

The UAV may preferably be of a weight and size so as to be portable and carried by an individual. In some embodiments, parts or components of the UAV may be removed or folded relative to a remainder of the UAV to facilitate portability.

As used herein, the term "projectile" refers to any non-precision guided or unguided/ballistic projectile configured to be deployed along an intelligently aimed course of trajectory. For example, and without limitation, the projectile may include a bullet, a shell, a grenade or any other man-portable micro-munition. In some embodiments, the projectile may include a non-lethal projectile. For example, the projectile may be configured to provide smoke or illumination. In yet other embodiments, the projectile may include a lifebuoy or an inflatable lift raft.

As used herein, the term "armed" is used to indicate that the UAV has an associated weapons system.

As used herein, the term "longitudinal axis" may refer to an axis that extends through the central body and the centre of gravity of the UAV between the nose and the tail.

As used herein, the term "roll axis" may refer to an axis having its origin at the centre of gravity of the UAV and extending forward along the longitudinal axis. Motion about the roll axis is called "roll". A positive roll motion may raise the left side rotor arm assembly and lower the right side rotor arm assembly. Conversely, a negative roll motion may lower the left side rotor assembly and raise the right side rotor arm assembly. A "roll angle" may refer to an angle of motion relative to the roll axis.

As used herein, the term "pitch axis" may refer to an axis having its origin at the centre of gravity of the UAV and extending planar to the roll axis in an orientation perpendicular to the roll axis and parallel to each side rotor arm assembly. Motion about the pitch axis is called "pitch". A positive pitch motion raises the nose of the UAV and lowers the tail. Conversely, a negative pitch motion lowers the nose of the UAV and raises the tail. A "pitch angle" may refer to an angle of motion relative to the pitch axis.

As used herein, the term "yaw axis" may refer to an axis that has its origin at the centre of gravity of the body of the UAV and extends downwards in an orientation perpendicular to the pitch axis. Motion about the yaw axis is called "yaw". A positive yaw motion moves the nose of the UAV to the right. Conversely, a negative yaw motion moves the nose to the left. A "yaw angle" may refer to an angle of motion relative to the yaw axis.

As used herein, the term "thrust" may refer to the individual propulsive force generated by each rotor of the UAV.

As indicated, the UAV includes an elongate central body from which the rotor arm assemblies may radially extend in a substantially horizontal orientation, preferably planar with the longitudinal axis and the pitch axis. The elongate central body may be of any suitable size, shape and construction and may be formed from any suitable material or materials.

Generally the elongate central body may be formed from a lightweight material or materials with high stiffness, strength and fatigue performance. Typically, the elongate central body may be formed from metal and/or plastic material or materials, or composites thereof. Preferably, the body may be formed from aluminium or a carbon fibre composite.

As indicated, the body includes the nose at a forward or front end of the body and an opposed tail at a rear end of the body. The nose and the tail are aligned along the longitudinal axis.

In some embodiments, the body may include an aerodynamic outer shell. The shell may be of integral construction or may be formed from two or more shell parts connected together, preferably the latter. The shell may preferably be formed from lightweight material or materials with high stiffness, strength and fatigue performance. For example, the shell may be formed from plastic material or materials, or composites thereof.

The shell may have any suitable cross-sectional shape along the longitudinal axis. For example, in some embodiments, the shell may have a circular or oval-shaped cross-section. In other embodiments, the shell may have a substantially triangular, rectangular or other polygonal cross-section.

In yet other embodiments, the shell may have a substantially rectangular cross-sectional shape at its widest point with an upper wall, an opposed lower wall and opposed sidewalls extending longitudinally between the nose and the tail.

As indicated, the shell may have a substantially aerodynamic shape. For example, the shell may include rounded edges and/or corners between a sidewall and an adjacent upper wall and/or lower wall and between a nose or tail and an adjacent sidewall, upper wall or lower wall. Generally, the walls and sidewalls may at least partially taper at or near each of the nose and the tail.

The shell may preferably be configured to house internal components of the UAV, such as, e.g., internal electronic components. The shell may include one or more openings defined therein for the protrusion of components, such as, e.g., sensors, image capturing devices and the like.

Each rotor arm assembly may include an arm member having an inner end extending from the central body and an opposed outer end, a motor and associated rotor located at or near the outer end of the arm member.

The rotor may be of any size, shape and form for providing a suitable propulsive force. The rotor may typically include one or more blades affixed to a central shaft, preferably at least two blades. The blades may be disposed symmetrically or asymmetrically about the central shaft.

The blades may be turned by rotation of the central shaft, which may be driven by the motor. The blades may be configured to rotate in a clockwise or anti-clockwise direction. For example, one or more rotors may rotate in an opposite direction to one or more other rotors to provide a torque counteracting a torque produced by the direction of rotation of the one or more other rotors.

The motor may be an electric motor or a combustion engine, preferably the former. The motor may include a drive shaft operatively coupled to the rotor to drive rotation of the rotor.

Each arm member may extend longitudinally between the inner and outer ends, preferably in a linear direction along its longitudinal axis. The arm member may be of tubular or solid construction, typically tubular. The arm member may have a substantially square or circular-shaped cross-section, preferably the latter.

Generally, each arm member may be formed from a lightweight material or materials with high stiffness, strength and fatigue performance. Typically, each arm member may be formed from metal and/or plastic material or materials, or composites thereof. Preferably, the arm may be formed from aluminium or a carbon fibre composite.

Each arm member may be connected to the body in any suitable way. For example, each arm member may be fixedly, movably and/or detachably connected to the body. Each arm member may be directly or indirectly connected to the body.

In some embodiments, one or more of the arm members may be rotatably coupled to the body such that each arm member may at least partially rotate about its longitudinal axis relative to the body, preferably the arm members of the opposed side rotor arm assemblies may be rotatably coupled to the body.

In some embodiments, each arm member may be connectable to the body by a connecting mechanism or part of a connecting mechanism. The connecting mechanism may include a first part associated with the inner end of the arm member and a second part connectable to the first part and associated with the body of the UAV.

The parts of the connecting mechanism may respectively include mateable male and female portions that couple together, including threaded connections, interference fit connections or bayonet-type connections, for example.

For example, a first part of the connecting mechanism associated with the inner end of the arm member may include a male formation configured to be inserted into or coupled with a female formation of a second part of the connecting mechanism associated with the body. Conversely, the first part of the connecting mechanism associated with the inner end of the arm member may include a female formation configured to receive or be coupled with a male formation of the second part of the connecting mechanism associated with the body.

In some embodiments, the inner end of the arm members of the rotor arm assemblies may be rotatably coupled to the body by way of a coupling mount.

The coupling mount may be of any suitable size, shape and construction configured to at least partially couple with the inner end of the arm and facilitate at least partial rotation of the arm about its longitudinal axis.

For example, in some embodiments the coupling amount may include a plurality of bearings to facilitate at least partial rotation of the arm relative to the body.

In other embodiments, the inner end of the arm member may include a cog or gear configured to mesh with one or more gear or cog wheels arranged within the coupling mount. Typically, each gear or cog wheel may be rotatably mounted within the coupling mount.

In some embodiments, the coupling mount may include a rotational, inner cylindrical portion, a non-rotational outer portion and at least one bridging component at least partially disposed therebetween to facilitate at least partial rotation of the inner cylindrical portion relative to the outer portion. The inner cylindrical portion may be connectable to the inner end of the arm member and the outer portion may be connectable to the body.

The at least one bridging component may be of any suitable size, shape and form.

For example, in some embodiments, the bridging component may include at least one bearing, preferably a plurality of bearings, disposed between the inner cylindrical portion and the outer portion.

In other embodiments, the bridging component may include at least one plain bearing disposed between the inner cylindrical portion and the outer portion. The plain bearing may be formed from a durable, low friction, low wear, heat resistant, corrosion resistant material or materials, such as, e.g., plastic, including nylon, polyacetal, polytetrafluoroethylene (PTFE), ultra-high-molecular-weight polyethylene (UHMWPE), rulon, PEEK, urethane or vespel (a high-performance polyimide).

In yet other embodiments, the bridging component may include a gear located on a peripheral surface of the inner cylindrical portion and configured to mesh with one or more gear or cog wheels rotatably coupled to the outer portion.

The inner end of the arm member may couple with the coupling mount in any suitable way.

For example, in some embodiments, the inner cylindrical portion may include a central opening configured to at least partially receive the inner end, preferably frictionally fit the inner end.

In other embodiments, the inner end of the arm member and the coupling mount may connect with a connecting mechanism or part of a connecting mechanism as previously described.

As indicated, the arm members of the opposed side rotor arm assemblies may preferably extend from opposite sides of the body about the pitch axis of the body. The pitch axis may preferably extend planar to the longitudinal axis in an orientation perpendicular to the longitudinal axis.

Likewise, the arm member of the tail rotor arm may preferably extend from the tail of the body along the longitudinal axis.

At least each of the side rotor arm assemblies may be selectively rotatable relative to the body, typically over a range of at least 90° about the pitch axis, preferably at least 180°, more preferably at least 270°.

Generally, each side rotor arm assembly may be selectively rotatable between a hover position in which the associated rotors are substantially horizontally oriented (i.e., having a substantially horizontal plane of rotation) and a forward-facing position in which the associated rotors are substantially vertically oriented (i.e., having a substantially vertical plane of rotation).

Generally speaking, when the rotors are substantially horizontally oriented, they may provide lift to the UAV. Conversely, when the rotors are substantially vertically oriented, they may provide thrust to the UAV. When the rotors are oriented at an angle between being substantially horizontally and substantially vertically oriented, they may provide both lift and thrust to the UAV.

Rotation of each of the side rotor arm assemblies relative to the body may be actuated by any suitable actuation mechanism, such as, e.g., an engine or motor. Typically, rotation of each of the side rotor arm assemblies relative to the body may be driven by a servomotor or stepper motor.

In use, selective rotation of the side rotor arm assemblies may enable the UAV to transition between at least three flight modes. The three flight modes may include a hover mode, a tilting hover mode and a forward flight mode.

In the hover mode, the UAV may operate like a conventional rotary wing-type UAV. The three rotors may provide lift thereby enabling the UAV to hover and take off and land vertically.

In this mode, roll control of the UAV may be achieved by differential thrust of each of the rotors of the side rotor arm assemblies. Pitch control may be achieved by differential thrust on the tail rotor arm assembly. Yaw control may be achieved by at least partial counter-rotation of the side rotor arm assemblies relative to the body.

In order to change its position (i.e., move), the UAV may pitch and roll to direct thrust from all three rotors in a desired direction of translation. A person skilled in the art will appreciate that trimmed thrust from each rotor will increase when the UAV is pitched or rolled to maintain altitude.

The UAV may move in a forward direction by pitching forward. The UAV may move in a rearwards direction by pitching rearwards. The UAV may move to either side by rolling to the desired side.

In the tilting hover mode, the UAV may maintain a positive or negative pitch angle while hovering, moving forward, rearwards or from side-to-side.

In this mode, roll control of the UAV may be achieved by differential thrust of each of the rotors of the side rotor arm assemblies. Pitch control may be achieved by differential thrust on the tail rotor arm assembly. Yaw control may be achieved by at least partial counter-rotation of the side rotor arm assemblies relative to the body.

When hovering, the side rotor arm assemblies may at least partially rotate relative to the body to counter the thrust provided by the rotor of the tail rotor arm assembly and thereby maintain the UAV's position and orientation, including the positive or negative pitch angle.

When moving forward or rearwards, the side rotor arm assemblies may at least partially rotate relative to the body to direct thrust from the two side arm rotors in a desired direction of translation, i.e., forward or rearwards, while the rotor of the tail rotor arm assembly may maintain a desired positive or negative pitch angle of the body.

Forward and rearwards propulsion is provided by the side rotor arm assemblies only.

Advantageously, the tilting hover mode enables the weapons system to be at least partially aimed towards ground-based targets.

In the forward flight mode, the side rotor arm assemblies may rotate forward relative to the body to the forward-facing position in which the associated rotors are substantially vertically oriented. Preferably, in such embodiments, the UAV may include one or more air foils provided along the length of each arm member of the side rotor arm assemblies for providing lift. Accordingly, in such embodiments, lift may be provided by the one or more air foils, rather than relying on propulsive forces only.

In this mode, roll control of the UAV may be achieved by at least partial counter-rotation of the side rotor arm assemblies relative to the body. Pitch control may be achieved by differential thrust of the rotor of the tail rotor arm assembly. Yaw control may be achieved by differential thrust of each of the rotors of the side rotor arm assemblies.

Like with the tilting hover mode, in this mode forward propulsion is provided by the side rotor arm assemblies only.

In some embodiments, the tail rotor arm assembly may further include one or more air foils, such as, e.g., one or more horizontal stabilisers. Advantageously, this may reduce the load of the rotor of the tail rotor arm assembly in pitch control.

The UAV may include two or more legs extending downwards from opposed sides of the body to support the UAV when resting on a support surface.

In some embodiments, each leg may further include at least one foot extending from an outer or distal end of the leg for resting on the support surface. The at least one foot may typically extend in substantially horizontal orientation from the outer or distal end of the leg.

In other embodiments, each leg may further include at least one foot clamp extending from an outer or distal end of the leg for clamping about a support bar, such as, e.g., a frame member of a fence, a railing, a window sill, or the like.

The at least one foot clamp may include a pair of opposed clamping members configured to be brought together to releasably clamp about the support bar.

Typically, the pair of opposed clamping members may be configured to be moved together and apart to clamp and release the support bar.

In some such embodiments, the at least one foot clamp may further include an actuating mechanism for moving the clamping members together and apart. Any suitable type of actuating mechanism may be used. The actuating mechanism may be manually actuated or by using a drive, preferably the latter. Movement may be linear, although non-linear movement such as rotary movement is also envisaged.

The drive may be a hydraulic or pneumatic ram, or an electric motor for moving the clamping members together and apart. Typically, the actuating mechanism may include an electromechanical solenoid.

In preferred embodiments, the UAV may have at least three legs including a pair of opposed side legs extending down from the body of the UAV at a location at or near a junction between each side of the body and an inner end of an associated side rotor arm assembly, and a rear leg extending down from the body of the UAV at a location at or near a junction between the tail of the body and an inner end of the tail rotor arm assembly.

As indicated, the UAV has a weapons system including at least one projectile intended to be at least partially aimed by the UAV.

The weapons system may include at least one barrel for guiding deployment of the projectile.

In some embodiments, the weapons system and the at least one barrel may be integrally formed with the body of the UAV, preferably such that the at least one barrel extends forward in a direction substantially parallel with the longitudinal axis.

In other embodiments, the weapons system may further include a barrel mount for mounting the at least one barrel to the UAV, typically an underside of the UAV, preferably an underside of the body of the UAV, more preferably directly underneath a centre of gravity of the body of the UAV. Preferably, the at least one barrel may be mounted such that the at least one barrel may extend forward in a direction substantially parallel with the longitudinal axis. The barrel may be releasably mountable so that differing sized barrels may be mounted to the UAV depending on the type of projectile to be deployed.

The at least one barrel may be of any suitable size, shape and construction and formed from any suitable material or materials to be carried by the UAV and be capable of launching a desired projectile. Typically, the barrel may be formed from metal material or materials.

The barrel may include an inner end and an opposed muzzle end from which the projectile exits when deployed. The weapons system may further include a firing mechanism associated with the inner end of the barrel for triggering deployment of the projectile from the barrel upon receiving a firing command.

The firing mechanism may be operatively associated with a firing pin or striker located at the inner end of barrel and be configured to move the firing pin or striker to a firing position in which the pin or striker strikes a primer of a cartridge associated with the projectile for propelling the projectile upon receiving the firing command.

The firing pin or striker may be manually moved or moved by a drive, preferably the latter. Movement may preferably be linear, although non-linear movement such as rotary movement is also envisaged.

In some embodiments, the firing mechanism may include one or more biasing mechanism so that movement of the firing pin or striker to the firing position moves under the force of the biasing mechanism. The biasing mechanism may include one or more springs, such as, e.g., coil or leaf springs. Of course, a person skilled in the art will appreciate that other types of biasing mechanisms, such as, e.g., magnets or magnetized elements and the like may be used.

In preferred embodiments, the firing mechanism may include an electromechanical solenoid. Typically, the electromechanical solenoid may slide the firing pin or striker into the firing position.

In some embodiments, the at least one barrel may be pivotally mountable to the UAV such that the at least one barrel may be at least partially pivotable relative to the body for aiming. Advantageously, this may enable greater accuracy be enabling the weapons system to be independently aimed relative to the orientation and/or position of the UAV.

Generally, the at least one barrel may be pivotally mountable about the inner end such that the muzzle end may be pivotally movable along both horizontal and vertical axes. The at least one barrel may be pivotable about any suitable range, typically about ±10° from its neutral or resting position when extending substantially parallel with the longitudinal axis of the body.

Pivotal movement of the at least one barrel relative to the body may be actuated by any suitable actuation mechanism, such as, e.g., an engine or motor. Typically, pivotal movement of the at least one barrel relative to the body may be driven by a servomotor or stepper motor.

In some embodiments, the barrel mount may be in the form of a barrel gimbal mechanism. The gimbal mechanism may be of any suitable form known in the art for stabilising the barrel relative to a remainder of the UAV.

Typically, the gimbal mechanism may provide at least two degrees of freedom, preferably three degrees of freedom. The barrel gimbal mechanism may include one or more actuating mechanisms for controlling movement of the barrel relative to the UAV, typically a servomotor or stepper motor.

In some embodiments, the weapons system may further include a range finder for determining a distance between the UAV and an object, such as, e.g., a target. The range finder may preferably be a laser range finder.

In some embodiments, the UAV may include at least one image capturing device to facilitate in flight and weapons system control. The at least one image capturing device may include any suitable device capable of capturing a plurality of images and/or video, depending on the type of image capturing device.

For example, in some embodiments, the image capturing device may include any one of a camera, a digital camera, a video camera, a thermographic camera, a night vision camera or any combination thereof. In other embodiments, the image capturing device may include a sensor. Depending on the type of image capturing device, the sensor may be a detector, such as, e.g., a charge coupled device or positron sensing device.

In some embodiments, the at least one image capturing device may include a plurality of image capturing devices. The plurality of image capturing devices may be of the same type or differing types, preferably the latter. For example, the device may include at least two, at least three, at least four, at least five, at least six, at least seven, at least eight, at least nine or even at least 10 image capturing device, preferably cameras. In some such embodiments, the cameras may be spaced from one another to provide a stereoscopic imaging system.

The at least one image capturing device may preferably be located at or near the nose of the body of the UAV, preferably alongside the range finder.

In some embodiments, the at least one image capturing device may be integrally formed with the body of the UAV. In other embodiments, the at least one image capturing device may be mounted to the body via a gimbal mechanism to at least partially insulate the image capturing device from noise of the UAV. The gimbal mechanism may include one or more actuating mechanisms for controlling movement of the at least one image capturing device relative to the UAV, typically a servomotor or stepper motor.

In preferred embodiments, the at least one image capturing device may include a visual and thermal camera gimbal providing at least two degrees of freedom.

In some embodiments, the UAV may include at least one emitter for emitting radiation in the form of visible light, near-infrared (IR), IR, or X-ray or soundwaves. Typically, the at least one emitter may be in the form of a light emitting device for at least partially illuminating a path of flight in front of the UAV, preferably in front of the nose of the body of the UAV. The light emitting device may be a light bulb or a light emitting diode ("LED"), for example.

In some embodiments, the at least one emitter may be located together with the at least one image capturing device, preferably at or near the nose of the body of the UAV. In some such embodiments, the at least one emitter may be mounted to the body together with the at least one image capturing device via the gimbal mechanism, preferably together with the range finder.

The UAV may include at least one global navigation satellite system ("GNSS") antenna and at least one modem. The GNSS antenna may be configured to receive radio waves from artificial satellites for determining positional coordinates of the UAV, preferably GNSS satellites, more preferably at least four GNSS satellites. Preferably, the GNSS antenna may be a Global Positioning System ("GPS") antenna.

Typically, the UAV may further include a GNSS receiver associated with at least one GNSS antenna for receiving output from the antenna, preferably a GPS receiver.

The at least one modem may be configured to be in communication with an external controller, such, as, e.g., a remote controller and/or a remotely accessible server, for the transmission of data between the external controller and the at least one modem. In some embodiments, the at least one modem may be a cellular modem. In other embodiments, the at least one modem may be a radio modem.

As indicated, the UAV includes a flight and targeting controller operatively associated with at least the rotor arm assemblies for controlling flight and targeting of the UAV. The controller may preferably also be operatively connected to one or more of the range finder, the at least one image capturing device, the at least one emitter, the at least one GNSS antenna, the at least one modem and any other electric components of the UAV.

In preferred embodiments, the controller may be part of a microcomputer, including one or more processors and a memory. The processors may include multiple inputs and outputs coupled to the other electronic components of the UAV.

For example, the one or more processors may have at least one input coupled to the at least one modem for receiving external commands from the external controller. The processors may likewise have one or more outputs coupled to the rotor arm assemblies for controlling thrust, trim and at least partial rotation of each rotor arm assembly for directing flight of the UAV, including switching between flight modes, responsive to receiving the external commands.

Likewise, the one or more processors may have at least one input coupled to the at least one image capturing device for receiving imaging data, such as, e.g., of a target. The processors may likewise have one or more outputs coupled to the at least one modem for transmitting the imaging data to the external controller.

Yet further, the one or more processors may have at least one output coupled to the weapons system for triggering deployment of the projectile responsive to receiving the firing command.

The controller may preferably be in communication with the external controller over a communications network. The network may include, among others, the Internet, LANs, WANs, GPRS network, a mobile communications network, a radio network, etc., and may include wireless communications links.

The UAV may preferably include a power supply for powering the electrical components of the UAV. The power source may include an on-board power source, such as, e.g., one or more batteries, preferably rechargeable batteries.

The at least one remotely accessible server may be any appropriate server computer, distributed server computer, cloud-based server computer, server computer cluster or the like. The server may typically include one or more processors and one or more memory units containing executable instructions/software to be executed by the one or more processors.

The server may generally be in communication with the UAV and may be configured to transmit communications between the UAV and the remote controller.

The communications may include imaging data, positional, velocity and altitude data, and command data, including flight command data and weapons system command data.

Flight command data may include, but not be limited to, altitude, forward acceleration, rear acceleration, roll angle, pitch angle and/or yaw angle commands. Additionally, the flight command data may include selecting flight mode, i.e., hover mode, tilting hover mode and/or forward flight mode.

As indicated, the UAV may be operated with varying degrees of autonomy ranging from fully autonomous to intermittently autonomous, or may be remotely controlled by a human operator.

For example, in some embodiments the flight and target controller may include an altitude hold function for maintaining the UAV at a desired altitude. In such embodiments, the flight and target controller may determine a vertical acceleration required to maintain the UAV at a desired altitude. Typically, the vertical acceleration may be calculated based on the gravitational mass of the UAV and the desired altitude.

The flight and target controller may base its calculations on any suitable algorithm for determining a hover trim for the altitude hold function. Typically, the hover trim may be determined by an algorithm based on a thrust multiplying factor ($t_{tact}$), the roll ($\varnothing$), the pitch ($\theta$), side rotor arm assembly deflection angles ($\delta_1$, $\delta_2$), and mass multiplied by gravitational acceleration (mg) for the UAV to calculate trimmed commanded thrusts for each of the three rotors ($f_{1\_trim}$, $f_{2\_trim}$, $f_{3\_trim}$) For example, the algorithm may be embodied by the equation:

$$\begin{vmatrix} f_{1\_trim} \\ f_{2\_trim} \\ f_{3\_trim} \end{vmatrix} = \begin{vmatrix} A & B & C \\ D & E & 0 \\ F & G & H \end{vmatrix}^{-1} \begin{bmatrix} mg * t_{fact} \\ 0 \\ 0 \end{bmatrix} \quad \text{Equation 1}$$

where:
A=$\sin(\delta_1)$ $\sin(\theta)$−$\cos(\delta_1)$ $\cos(\theta)$ $\cos(\varnothing)$
B=$\sin(\delta_2)$ $\sin(\theta)$−$\cos(\delta_2)$ $\cos(\theta)$ $\cos(\varnothing)$
C=−$\cos(\theta)$ $\cos(\varnothing)$
D=$s_{f1b2}$ $\cos(\delta_1)$
E=$s_{f2b2}$ $\cos(\delta_2)$
F=$s_{f1b3}$ $\sin(\delta_1)$−$s_{f1b1}$ $\cos(\delta_1)$
G=$s_{f2b3}$ $\sin(\delta_2)$−$s_{f2b1}$ $\cos(\delta_2)$
H=−$s_{f3b1}$
$s_{f1b2}$=the displacement from the centre of gravity of the body of the UAV to a first side arm assembly rotor ($f_1$)
$s_{f2b2}$=the displacement from the centre of gravity of the body of the UAV to a second side arm assembly rotor ($f_2$).
$s_{f3b2}$=the displacement from the centre of gravity of the body of the UAV to the tail arm assembly rotor ($f_3$).
$s_{f1b1}$=the displacement from the centre of gravity of the body of the UAV to a first side arm rotor assembly ($f_1$) axis of rotor rotation in the longitudinal body (x) direction.
$s_{f1b3}$=the displacement from the centre of gravity of the body of the UAV to a first side arm rotor assembly ($f_1$) axis of rotor rotation in the out of plane vertical (z) direction.
$s_{f2b1}$=the displacement from the centre of gravity of the body of the UAV to a second side arm rotor assembly ($f_2$) axis of rotor rotation in the longitudinal body (x) direction.
$s_{f2b3}$=the displacement from the centre of gravity of the body of the UAV to a second side arm rotor assembly ($f_2$) axis of rotor rotation in the out of plane vertical (z) direction.
$s_{f3b1}$=the displacement from the centre of gravity of the body of the UAV to the tail arm assembly rotor assembly ($f_3$) axis of rotor rotation in the longitudinal body (x) direction.

In some embodiments, the flight and target controller may include a hover roll hold function for maintaining the UAV at a desired roll angle by commanding differential thrust of each of the rotors of the side rotor arm assemblies. In such embodiments, the flight and target controller may determine a difference between a current roll angle of the UAV and the desired roll angle and, responsive to determining the difference, may then determine a required thrust from each side rotor to roll the UAV to the desired roll angle or maintain the UAV at the desired roll angle.

In some embodiments, the flight and target controller may include a hover pitch function for maintaining the UAV at a desired pitch angle by commanding differential thrust of the rotor of the tail rotor arm assembly. In such embodiments, the flight and target controller may determine a difference between a current pitch angle of the UAV and the desired pitch angle and, responsive to determining the difference, may then determine a required thrust from the tail rotor to pitch the UAV to the desired pitch angle or maintain the UAV at the desired pitch angle.

In some embodiments, the flight and target controller may include a hover yaw function for maintaining the UAV at, or orienting the UAV to, a desired yaw angle by commanding counter-rotation of the side rotor arm assemblies relative to the body (and therefore differential rotor angular deflections). In such embodiments, the flight and target controller may determine a difference between a current yaw angle of the UAV and the desired yaw angle and, responsive to determining the difference, may then determine a required counter-rotation of the side rotor arm assemblies relative to the body to achieve the required differential rotor angular deflections to orient the UAV to the desired yaw angle or maintain the UAV at the desired yaw angle.

In some embodiments, the flight and target controller may include a tilt feedback function for determining a required roll angle to achieve a desired roll angle when the UAV is in tilting hover mode and at a desired pitch angle. In such embodiments, the flight and target controller may determine a required differential thrust from each side rotor to roll the UAV to the required roll angle while maintaining the UAV at the desired pitch angle.

The flight and target controller may base its calculations on any suitable algorithm for determining a required roll angle and thus a required differential thrust from each side rotor. Typically, the required roll angle may be determined by an algorithm based on current roll (Ø) and pitch (θ) angles of the UAV and may apply a transformation matrix to determine an effective roll angle, and equivalent roll rate and yaw rate. For example, the algorithm may be embodied by the following equations:

$$t = \tan^{-1}\left(\frac{\sin(\theta)}{\cos(\theta)\cos(\emptyset)}\right) \quad \text{Equation 2}$$

where "t" is an angle of the longitudinal axis relative to a horizontal plane.

A transformation matrix is then defined between the body coordinates (B) and the new horizontal body coordinates (Z) according to the following equation:

$$[T]^{ZB} = \begin{bmatrix} \cos(t) & 0 & -\sin(t) \\ 0 & 1 & 0 \\ \sin(t) & 0 & \cos(t) \end{bmatrix} \quad \text{Equation 3}$$

The transformation matrix from local North-East-Down coordinates to body coordinates is then assembled according to the following equation:

$$[T]^{BL} = \begin{bmatrix} \cos\varphi\cos\theta & \sin\varphi\cos\theta & -\sin\theta \\ \cos\varphi\sin\theta\sin\emptyset - \sin\varphi\cos\emptyset & \sin\varphi\sin\theta\sin\emptyset + \cos\varphi\cos\emptyset & \cos\theta\sin\emptyset \\ \cos\varphi\sin\theta\cos\emptyset + \sin\varphi\sin\emptyset & \sin\varphi\sin\theta\cos\emptyset - \cos\varphi\sin\emptyset & \cos\theta\cos\emptyset \end{bmatrix} \quad \text{Equation 4}$$

The transformation matrix from local North-East-Down coordinates to horizontal body coordinates is then calculated according to the following equation:

$$[T]^{ZL} = [T]^{ZB}[T]^{BL} \quad \text{Equation 5}$$

The effective roll angle ($\emptyset_{ZL}$) may be calculated according to the following equation:

$$\emptyset_{ZL} = \sin^{-1}([T]^{ZL}(2,3)) \quad \text{Equation 6}$$

The equivalent roll rate ($p_z$) and yaw rate ($r_z$) are then calculated according to the following equations:

$$p_z = p\cos(t) + r\sin(t) \quad \text{Equation 7}$$

$$r_z = -p\sin(t) + r\cos(t) \quad \text{Equation 8}$$

where:
p and r=the original roll rate and yaw rate, and
$p_z$ and $r_z$=the equivalent roll and yaw rate when in tilting hover mode.

In some embodiments, the flight and target controller may include a tilt control function for determining a required rotation of the side rotor arm assemblies relative to the body (and therefore trimmed side rotor deflection angle) based on a desired pitch angle and forward acceleration request. In such embodiments, the flight and target controller calculates a required trimmed side rotor deflection angle ($\delta_{PAR\_TR}$) for both side rotors based on the desired and/or current pitch angle (θ). The flight and target controller may base its calculation of $\delta_{PAR\_TR}$ on any suitable algorithm. For example, the algorithm may be embodied by the following equations:

$$\begin{bmatrix} -f_3 \\ -f_1\cos(\delta_{PAR\_TR}) \\ -f_1\sin(\delta_{PAR\_TR}) \end{bmatrix} = \quad \text{Equation 9}$$

$$\begin{bmatrix} -s_{f3b1} & -(s_{f1b1} + s_{f2b1}) & s_{f1b3} + s_{f2b3} \\ \sin(\theta) & 2\sin(\theta) & 2\cos(\theta) \\ \cos(\theta) & 2\cos(\theta) & -2\sin(\theta) \end{bmatrix} \begin{bmatrix} 0 \\ 0 \\ mg \end{bmatrix}$$

where:
$s_{f1b1}$=the displacement from the centre of gravity of the body of the UAV to a first side arm rotor assembly ($f_1$) axis of rotor rotation in the longitudinal body (x) direction;
$s_{f1b3}$=the displacement from the centre of gravity of the body of the UAV to a first side arm rotor assembly ($f_1$) axis of rotor rotation in the out of plane vertical (z) direction;
$s_{f2b1}$=the displacement from the centre of gravity of the body of the UAV to a second side arm rotor assembly ($f_2$) axis of rotor rotation in the longitudinal body (x) direction;
$s_{f2b3}$=the displacement from the centre of gravity of the body of the UAV to a second side arm rotor assembly ($f_2$) axis of rotor rotation in the out of plane vertical (z) direction; and
$s_{f3b1}$=the displacement from the centre of gravity of the body of the UAV to the tail arm assembly rotor assembly ($f_3$) axis of rotor rotation in the longitudinal body (x) direction.

The trimmed side rotor deflection angle ($\delta_{PAR\_TR}$) may then be calculated based on the following equation:

$$\delta_{PAR\_TR} = \tan^{-1}\left(\frac{f_1\cos(\delta_{PAR\_TR})}{f_1\sin(\delta_{PAR\_TR})}\right) \quad \text{Equation 10}$$

The side rotor deflection command ($\delta_{PAR}$) is then amended with any forward acceleration commands. This may be calculated based on the following equation:

$$\delta_{PAR} = \delta_{PAR\_TR} + x_{acc\_com} \quad \text{Equation 11}$$

where "$x_{acc\_com}$" is the forward acceleration command.

Typically, the flight and target controller may generate five flight commands, namely thrust commands for the three rotors, and selective rotation commands for the opposed side rotor arm assemblies (i.e., side rotor angular deflections). The controller may generate the commands based on any suitable algorithm. For example, the algorithm may be embodied by the following equations:

$$f_{1\_com}=f_{1\_trim}+0.5(df12) \quad \text{Equation 12}$$

$$f_{2\_com}=f_{2\_trim}-0.5(df12) \quad \text{Equation 13}$$

$$f_{3\_com}=f_{3\_trim}+(df34) \quad \text{Equation 14}$$

$$\delta_{1\_com}=\delta_{PAR}-0.5(drc) \quad \text{Equation 15}$$

$$\delta_{2\_com}=\delta_{PAR}+0.5(drc) \quad \text{Equation 16}$$

Typically, upon generating the commands, the flight and target controller may test the commands generated against limiters for maximum/minimum thrust and side rotor angular deflections. If the commands generated are deemed acceptable, the commands are transmitted to the respective rotor arm assemblies.

In some embodiments, the flight and target controller may include a trim thrust function for determining trim values for the rotors when the UAV is in forward flight mode. In such embodiments, the flight and target controller may refer to or look-up an altitude/drag database containing an estimated value of drag for a corresponding velocity and altitude. Upon to determining the relevant drag value, the controller may generate the trim thrust commands for the side rotors based on any suitable algorithm. For example, the algorithm may be embodied by the following equation:

$$f_{1\_trim}=f_{2\_trim}=0.5D \quad \text{Equation 17}$$

where "D" is the calculated or determined drag value.

Typically, in such embodiments, the flight and target controller may determine a tail rotor trim value ($f_{3\_trim}$) based on a pitching moment summation.

When the UAV is in forward flight mode, the flight and target controller may generate five flight commands, namely thrust commands for the three rotors, and selective rotation commands for the opposed side rotor arm assemblies (i.e., side rotor angular deflections). The controller may generate the commands based on any suitable algorithm. For example, the algorithm may be embodied by Equations 12-14 as outlined above with the side rotor angular deflection commands ($\delta_{1\_com}$, $\delta_{2\_com}$) being generated according to the following equations:

$$\delta_{1\_com}=\frac{\pi}{2}-0.5(drc) \quad \text{Equation 18}$$

$$\delta_{2\_com}=\frac{\pi}{2}+0.5(drc) \quad \text{Equation 19}$$

Weapons system command data may include, but not be limited to, on/off, aiming the image capturing device, aiming the range finder, aiming the at least one projectile and/or firing commands. Additionally, the weapons system command data may include selecting the at least one projectile and/or re-load commands.

As indicated, the flight and targeting controller may be configured to determine at least a pitch angle and a yaw angle required to strike a target with the weapons system, preferably the at least one projectile. The pitch angle and the yaw angle may be determined based upon target information received. The flight and targeting controller may then selectively control operation of each rotor arm assembly for aiming the weapons system, preferably the at least one projectile, based on the pitch angle and the yaw angle determined.

In further embodiments and responsive to receiving the target information, the flight and targeting controller may determine a barrel pitch angle and a barrel yaw angle. The flight and targeting controller may then selectively control operation of the barrel mount for aiming the at least one barrel of the weapons system independent of the UAV and based on the barrel pitch angle and the barrel yaw angle determined.

In such embodiments, the UAV may autonomously collect the target information, for example via the at least one image capturing device. In other such embodiments, the target information may be provided by the external controller, such as, e.g., the remote controller. The target information may typically include target type, target location, and/or whether or not the target is armed. The target type may include live targets, such as, e.g., a human or group of humans, and non-live targets, such as, e.g., buildings and structures. The target location may include data as to the target's location relative to the UAV or relative to a common point, preferably in North east down ("NED") coordinates.

In some such embodiments, the target information may include information as to the type of weapon that the target is armed with. For example, the target information may indicate that the target is carrying a gun, a knife, an explosive device. Further, the target information may include information as to the type of gun, such as, e.g., whether or not it is a pistol, a rifle, a semi-automatic machine gun, and the make of the gun, e.g., AK-47, M16, etc.

In some embodiments, the flight and targeting controller may determine an effective firing range ("EFR") for the at least one projectile if deployed at a target based on the UAV's current position, including altitude. In such embodiments, the flight and targeting controller may refer to, or look-up, a projectile database containing a range value for the at least one projectile.

In some embodiments, the flight and targeting controller may further determine an estimate of circular error probable ("CEP") for the at least one projectile if deployed at a target based on the UAV's current position, including altitude. In such embodiments, the flight and targeting controller may refer to, or look-up, a projectile database containing CEP values for the at least one projectile based on monte-carlo simulations with uncertainty in muzzle velocity, wind, pitch and yaw.

In some embodiments, the flight and targeting controller may determine an effective casualty radius ("ECR") for the at least one projectile if deployed at a target based on the UAV's current position, including altitude. In such embodiments, the flight and targeting controller may refer to, or look-up, a projectile database containing a blast radius value for the at least one projectile to determine the ECR.

In some embodiments, the flight and targeting controller may determine a collateral damage estimation ("CDE") for the at least one projectile if deployed at a target based on the UAV's current position, including altitude. In such embodiments, the flight and targeting controller may refer to, or look-up, a projectile database containing a blast radius value for the at least one projectile to determine the CDE.

In further embodiments and responsive to receiving the target information, the flight and targeting controller may determine a pitch angle and a yaw angle for aiming the ranger finder at the target. In some such embodiments, the flight and targeting controller may then selectively control operation of each rotor arm assembly for aiming the range finder based on the pitch angle and the yaw angle determined. In other such embodiments in which the ranger finder is mounted together with the at least one image capturing device to the body of the UAV via the gimbal mechanism, the flight and targeting controller may then selectively control operation of the gimbal mechanism to aim the ranger finder at the target.

The remote controller may include one or more keys, buttons and/or switches for a user to control operation of the UAV. The controller may preferably include at least one display. The display may display imaging and/or positional, velocity and altitude data transmitted by the UAV.

The display may be of any suitable form. For example, the display may be a liquid crystal display ("LCD"), plasma display or an LED display. In some embodiments, the remote controller may include a touch screen to allow a user to interact with the controller.

The display of the remote controller may display image data collected by the at least one image capturing device of the UAV, preferably in real-time. The display may also display satellite image data or map data annotated with a location of the UAV and/or a target. In use, a user may interact with the image data displayed to determine a distance between the UAV and the target or order the UAV to determine the range to target, typically via the range finder. The image data of a target displayed may also be annotated with target information, such as, e.g., CEP, EFR, and/or ECR. Typically, such target information may be displayed when a user selects or clicks on a target displayed.

Generally, a user may interact with the image data displayed on the at least one display. For example, the user may pan, tilt, zoom the at least one image capturing device of the UAV to alter the image data displayed on the at least one display of the UAV.

In some embodiments, the at least one display may also display a representation of the UAV annotated with an indication of the flight mode selected, including the pitch angle and the average deflection angle of the side rotors. In some such embodiments, the display may further display a slider with the representation, which a user may interact with to alter flight of the UAV, such as, e.g., the pitch angle.

The remote controller may enable a user to toggle the weapons system of the UAV between active and inactive modes.

The remote controller may enable a user to issue a fire command to the UAV when the weapons system is active. The fire command may be transmitted to the UAV via a wireless network and may be encrypted or non-encrypted. Typically, the fire command may be transmitted via a radio link.

The remote controller may enable a user to select from a range of projectiles carried by the UAV.

The remote controller may enable a user to toggle between fight modes of the UAV.

The remote controller may include a communications module for communication with the UAV and the remotely accessible server. The communications module may be in the form of a wireless communications module, such as, e.g., a wireless network interface controller, such that the controller may wirelessly connect to the device via a wireless network (e.g., Wi-Fi (WLAN) communication, Satellite communication, RF communication, infrared communication, or Bluetooth™).

The remote controller may include a microcomputer including one or more processors and a memory.

In some embodiments, the remote controller may be in the form of a computing device, preferably a portable computing device, such as, e.g., a laptop. In such embodiments, armed control system may include software configured to be run on the computing device and/or the remotely accessible server. The software may preferably be interactive and allow a user to interact and control the UAV.

In some embodiments, the remote controller may be in the form of a mobile computing device, such as, e.g., a smart phone, a tablet, or a smart watch. In such embodiments, the remote controller or system may further include software in the form of an application (i.e., an app) configured to be run on the mobile computing device and allow a user to interact and control the UAV.

Communications received and transmitted between the UAV, the remote controller and the remotely accessible server may be carried via a private network connection established between the UAV and the remote controller, the UAV and the remotely accessible server and/or the remotely accessible server and the remote controller.

For example, in some embodiments, the private network connection may be a secure communication session across an encrypted communication channel such as, e.g., Hyper-text Transfer Protocol Secure (HTTPS), Transport Layer Security/Secure Sockets Layer (TLS/SSL) or some other secure channel.

In some preferred embodiments, the private network connection may be a VPN connection established using an encrypted layered tunnelling protocol and authentication methods, including identifiers, passwords and/or certificates.

According to a fourth aspect of the present invention, there is provided a method of firing a projectile from an armed UAV, said method including:

providing the armed UAV of the first aspect;
identifying a target and determining target information;
based on said target information, determining at least a pitch angle and yaw angle required to strike the target with the projectile;
moving the UAV, based at least on the pitch angle and the yaw angle determined, to at least partially aim the UAV; and
firing the at least one projectile at the target from the UAV.

The method may include one or more features or characteristics of the armed UAV, the control system and the remote controller as hereinbefore described.

In some embodiments, the method may further include moving the weapons system relative to the UAV and based at least on the pitch angle and the yaw angle determined.

In some embodiments in which the UAV includes a range finder, the method may additionally include determining at least a pitch angle and a yaw angle required to aim the range finder at the target. In such embodiments, the UAV may be moved based on the pitch angle and the yaw angle determined to aim the range finder at the target. In other such embodiments, the gimbal mechanism mounting the range finder to the body of the UAV may be moved based on the pitch angle and the yaw angle determined.

In some embodiments, the UAV may autonomously fire the at least one projectile.

In other embodiments, the firing may include transmitting a firing command to the UAV via a remote control. The firing command may be transmitted over a wireless network, preferably a radio link. The radio link may be an encrypted or non-encrypted radio link.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

FIGS. 1 to 8 show an armed unmanned aerial vehicle ("UAV"; 100) and parts thereof according to embodiments of the present invention.

Figure 1A:
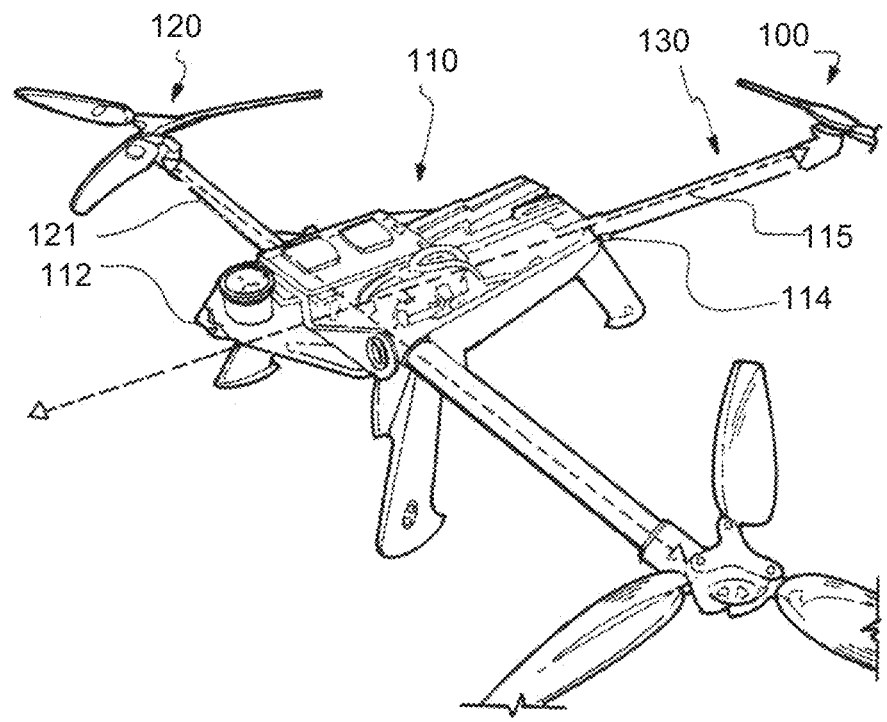
FIGS. 1A and 1B respectively show an upper perspective view and a bottom view of an armed UAV according to an embodiment of the present invention. The UAV is shown in FIG. 1A with the weapons system removed and in FIG. 1B with the rotor arm assemblies removed.

Referring to FIG. 1A, the UAV (100) includes: an elongate body (110) having a nose (112) and an opposed tail (114) aligned along a longitudinal axis (115); a pair of opposed side rotor arm assemblies (120) respectively extending from opposite sides (116) of the body (110) about a pitch axis (121), each side rotor arm assembly (120) being selectively rotatable relative to the body (110) about the pitch axis (121); and a tail rotor arm assembly (130) extending from the tail (114) of the body (110) along the longitudinal axis (115).

Figure 1B:
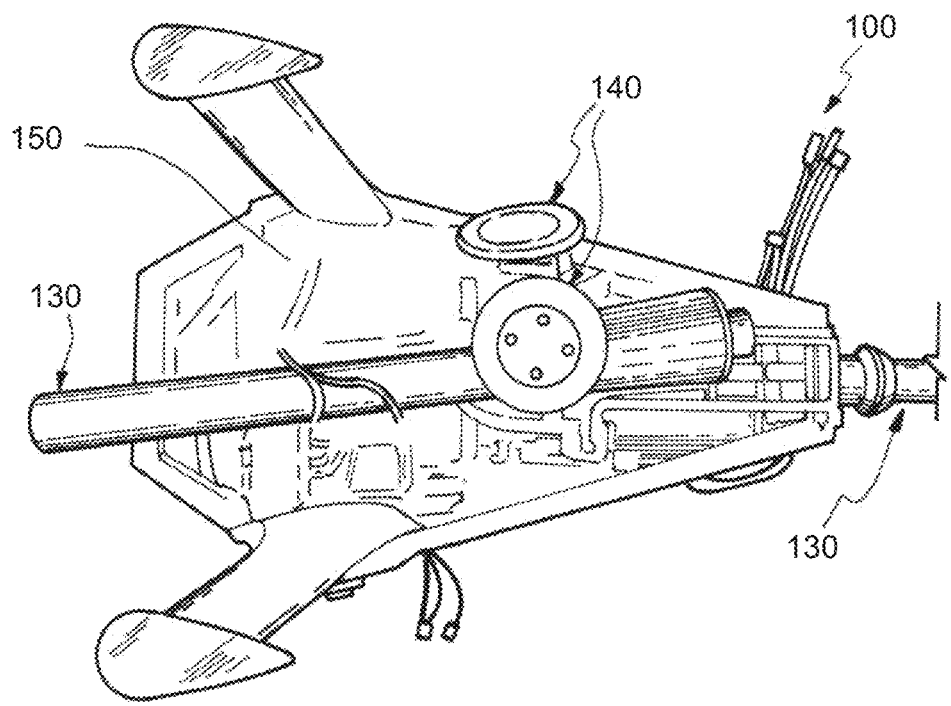

Referring to FIG. 1B, the UAV (100) further includes a weapons system including a barrel (130) for deploying a projectile; a barrel gimbal mechanism (140) for stabilising and pivoting the barrel (130) relative to the UAV (100); and an on-board flight and targeting controller (150) operatively associated with the side rotor arm assemblies (120; not shown), the tail rotor arm assembly (130; partly shown) and the weapons system, including the barrel gimbal mechanism (140).

Referring to FIGS. 1A and 1B, the flight and targeting controller (150) is configured to selectively control each rotor arm assembly (120,130) responsive to receiving external commands for directing a flight path of the UAV (100), including switching between flight modes. Further and in response to receiving target information about a target, the flight and targeting controller (150) is configured to determine a pitch angle and a yaw angle required to strike the target with the projectile and then selectively control operation of each said rotor arm assembly (120, 130) and the barrel gimbal mechanism (140) to aim the weapons system, based on the pitch angle and the yaw angle determined.

The UAV (100) is configured to operate with varying degrees of autonomy ranging from fully autonomous to intermittently autonomous, or can be remotely controlled by a human operator.

The UAV (100) is capable of moving freely within the environment with respect to six degrees of freedom (e.g., three degrees of freedom in translation and three degrees of freedom in rotation). Further, the UAV (100) is capable of taking off from a surface, landing on a surface, maintaining its current position and/or orientation (e.g., hovering), and/or changing its position.

The UAV (100) is of a weight and size so as to be portable and carried by an individual.

Figure 2A:
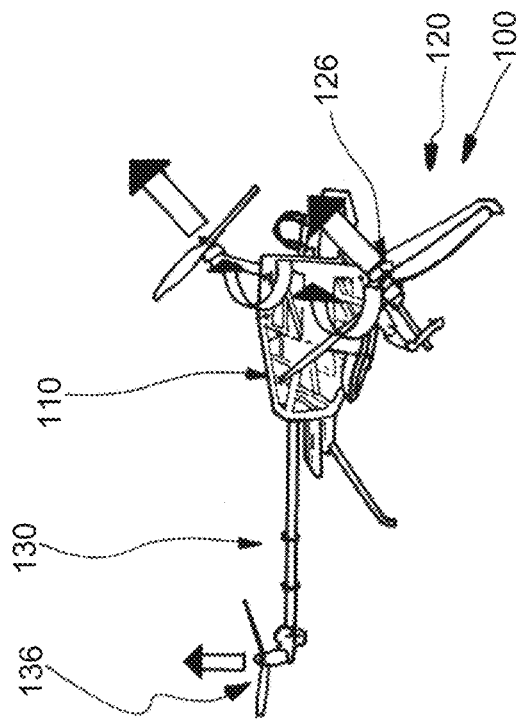
FIGS. 2A to 2C respectively show the flight modes of an armed UAV according to another embodiment of the present invention. The UAV is again shown with the weapons system removed.

Referring to FIG. 2A, the body (110) in some embodiments may include an aerodynamic outer shell.

Each rotor arm assembly (120, 130) includes an arm member (122, 132) having an inner end extending from the central body (110) and an opposed outer end, a motor (124, 134) and an associated rotor (126, 136) located at or near the outer end of the arm member (122, 132).

The rotor (126, 136) include two or more blades (128, 138) affixed to a central shaft. The blades (128, 138) are disposed symmetrically about the central shaft.

In use, the blades (128, 138) are turned by rotation of the central shaft, which is driven by the motor (124, 134). The blades (128, 138) are configured to rotate in a clockwise or anti-clockwise direction. Specifically, the side rotors (126) are configured to rotate in opposite directions relative to one another to provide a counteracting torque.

The motors (124, 134) are electric motors and each include a drive shaft operatively coupled to a rotor (126, 136) to drive rotation of the rotor (126, 136).

Each arm member (122, 132) extends longitudinally between the inner and outer ends in a linear direction along its longitudinal axis. The arm members (122, 132) are of a tubular construction with a substantially circular cross-section.

The arm members (122, 132) are formed from a lightweight but strong carbon fibre composite material.

As indicated, the arms (122) of the side rotor arm assemblies (120) are rotatably coupled to the body (110) such that each arm member (122) together with its associated rotor (126) and motor (124) is able to be at least partially rotated about its longitudinal axis relative to the body (110). The arm member (132) of the tail rotor arm assembly (130) is fixedly coupled to the body (110) in a non-rotatable manner.

The side rotor arm assemblies (120) are rotatably coupled to the body (110) by way of a coupling mount including a plurality of bearings. Selective rotation of each side rotor arm assembly (120) relative to the body (110) is achieved by an operatively connected servomotor mechanism.

The side rotor arm assemblies (120) can be selectively rotated relative to the body (110) over a range of at least 270°.

Figure 2B:
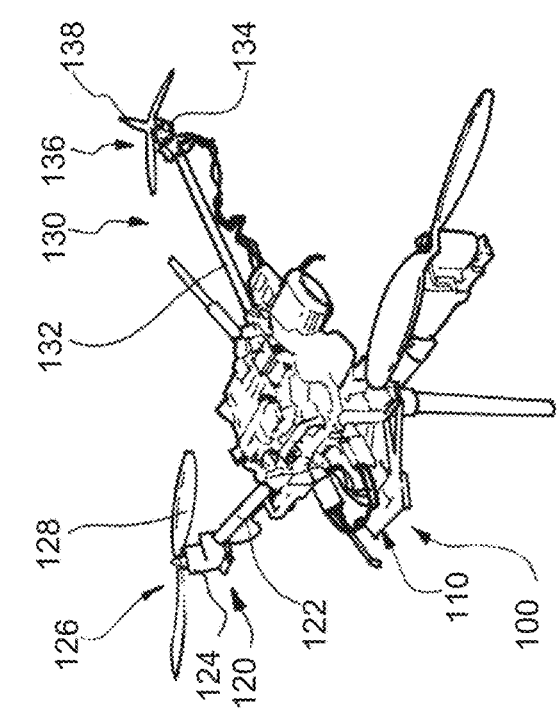
Figure 2C:
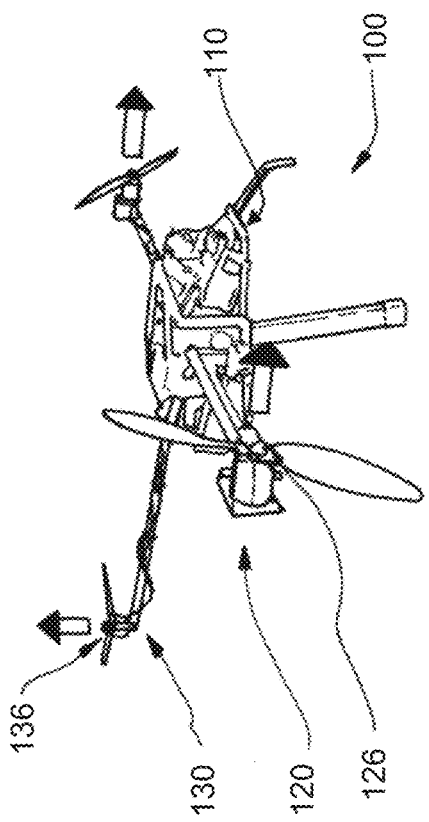
Figure 3:
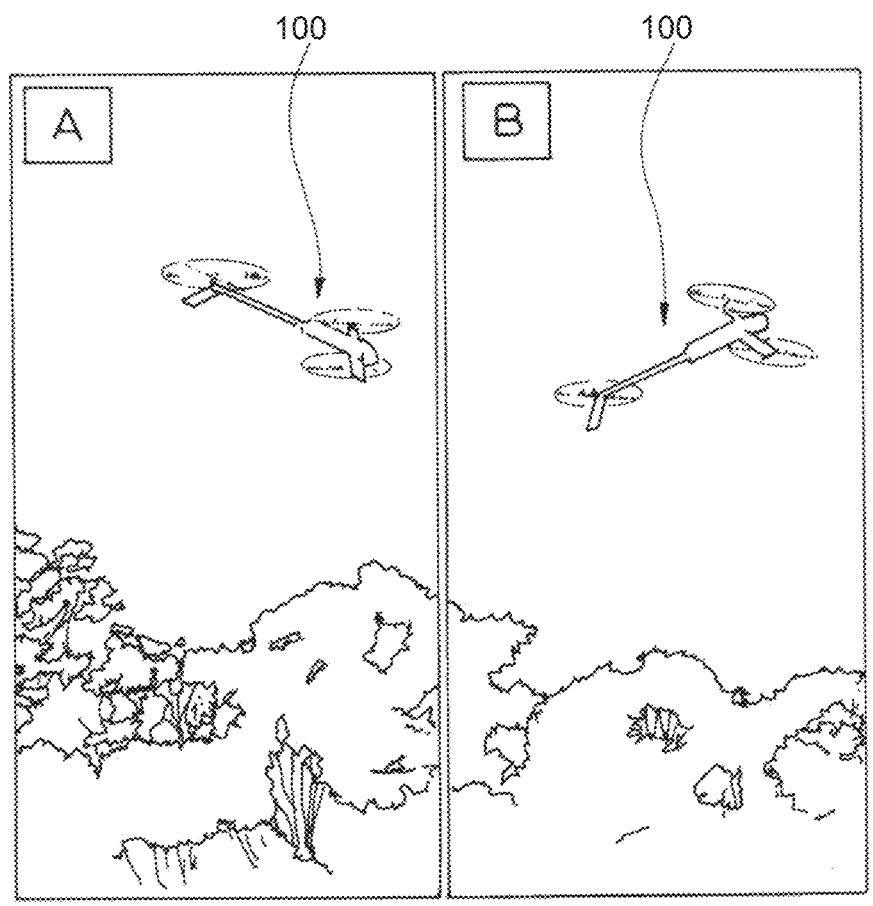
FIGS. 3A and 3B respectively show the armed UAV as shown in FIGS. 1A and 1B in a tilting hover flight mode.

With reference to FIGS. 2A, 2B, and 2C, each side rotor arm assembly (120) is selectively rotatable between a hover position shown in FIG. 2A in which the associated rotors (126) are substantially horizontally oriented (i.e., having a substantially horizontal plane of rotation) and a forward-facing position as shown in FIG. 2C in which the associated rotors (126) are substantially vertically oriented (i.e., having a substantially vertical plane of rotation).

Generally speaking, when the rotors (126) are substantially horizontally oriented, they provide lift to the UAV (100). Conversely, when the rotors (126) are substantially vertically oriented, they provide thrust to the UAV (100). When the rotors (126) are oriented at an angle between being substantially horizontally and substantially vertically oriented as shown specifically in FIG. 2B, they provide both lift and thrust to the UAV (100).

In use, selective rotation of the side rotor arm assemblies (120) enables the UAV (100) to transition between three flight modes, namely a hover mode as shown in FIG. 2A, a tilting hover mode as shown in FIG. 2B and a forward flight mode as shown in FIG. 2C.

Referring to FIG. 2A, in the hover mode the UAV (100) operates like a conventional rotary wing-type UAV. The three rotors (126, 139) may provide lift thereby enabling the UAV (100) to hover and take off and land vertically.

In this mode, roll control of the UAV (100) is achieved by differential thrust of each of the rotors (126) of the side rotor arm assemblies (120). Pitch control is achieved by differential thrust on the rotor (136) of the tail rotor arm assembly (130). Yaw control is achieved by partial counter-rotation of the side rotor arm assemblies (120) relative to the body (110).

In order to change its position (i.e., move), the UAV (100) pitches and rolls to direct thrust from all three rotors (126, 136) in a desired direction of translation. Specifically, the UAV (100) moves in a forward direction by pitching forward, in a rearwards direction by pitching rearwards, and to either side by rolling to the desired side.

Best shown in FIGS. 3A and 3B, in the tilting hover mode the UAV (100) is able to maintain a negative pitch as shown in FIG. 3A or a positive pitch angle as shown in FIG. 3B while hovering, moving forward, rearwards or from side-to-side.

Referring back to FIG. 2B, in this mode roll control of the UAV (100) is achieved by differential thrust of each of the rotors (126) of the side rotor arm assemblies (120). Pitch control is achieved by differential thrust on the rotor (136) of the tail rotor arm assembly (130). Yaw control is achieved by counter-rotation of the side rotor arm assemblies (120) relative to the body (110).

When hovering, the side rotor arm assemblies (120) at least partially rotate relative to the body (100) to counter thrust provided by the rotor (136) of the tail rotor arm assembly (130) and thereby maintain the UAV's position and orientation, including the positive or negative pitch angle.

When moving forward or rearwards, the side rotor arm assemblies (120) at least partially rotate relative to the body (120) to direct thrust from the two rotors (126) in a desired direction of translation, i.e., forward or rearwards, while the rotor (136) of the tail rotor arm assembly (130) maintains a desired positive or negative pitch angle of the body (110).

Forward and rearwards propulsion is provided by the rotors (126) of the side rotor arm assemblies (120) only.

Referring to FIG. 2C, in the forward flight mode the side rotor arm assemblies (120) rotate forward relative to the body (110) to a forward-facing position in which the associated rotors (126) are substantially vertically oriented.

In this mode, roll control of the UAV (100) is achieved by at least partial counter-rotation of the side rotor arm assemblies (120) relative to the body (110). Pitch control is achieved by differential thrust of the rotor (136) of the tail rotor arm assembly (130). Yaw control is achieved by differential thrust of each of the rotors (126) of the side rotor arm assemblies (120).

Like with the tilting hover mode, in this mode forward propulsion is provided by the rotors (126) of the side rotor arm assemblies (120) only.

Figure 8:
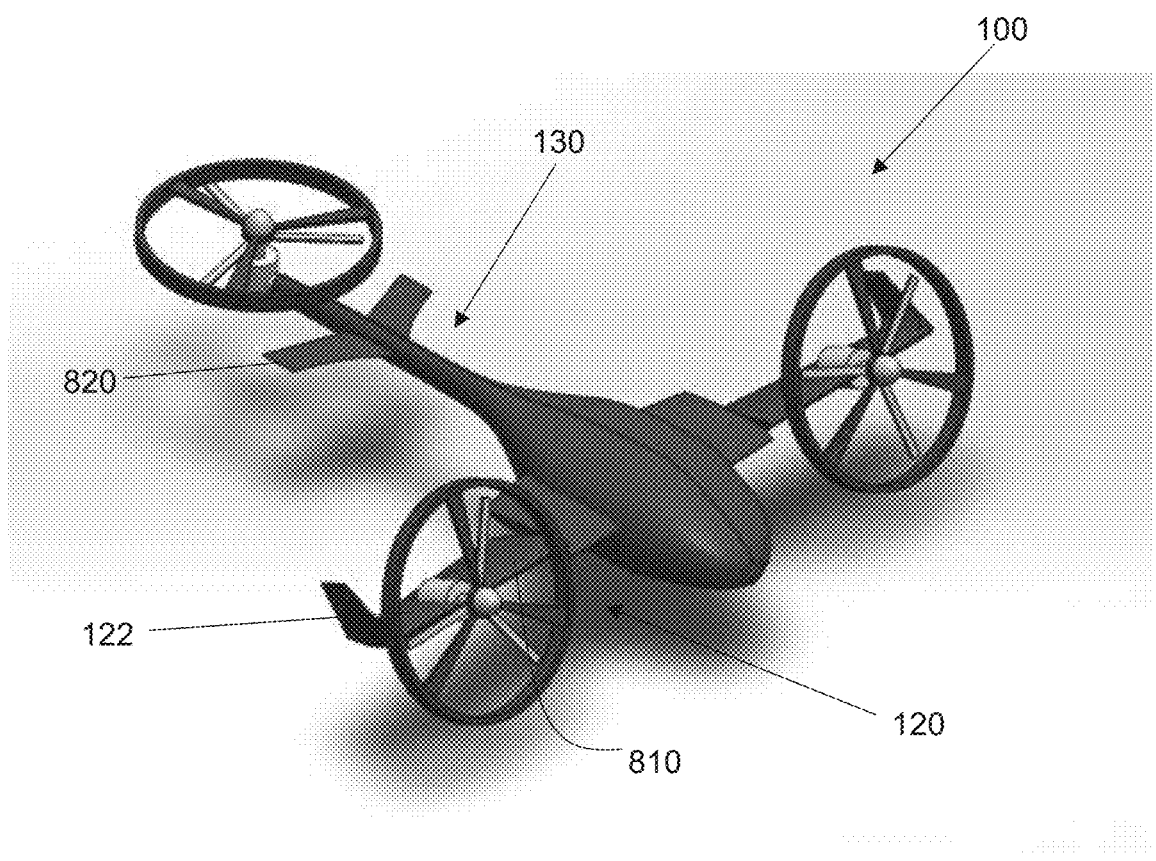
FIG. 8 shows an upper perspective view of an armed UAV according to another embodiment of the present invention.

Referring briefly to FIG. 8, in some embodiments the UAV (100) can include one or more air foils (810) provided along a length of each arm member (122) of the side rotor arm assemblies (120) for providing lift. Accordingly, in such embodiments, lift is provided by the one or more air foils (810), rather than relying on propulsive forces only.

Further, the tail rotor arm assembly (130) can include one or more one or more horizontal stabilisers (820).

Figure 4:
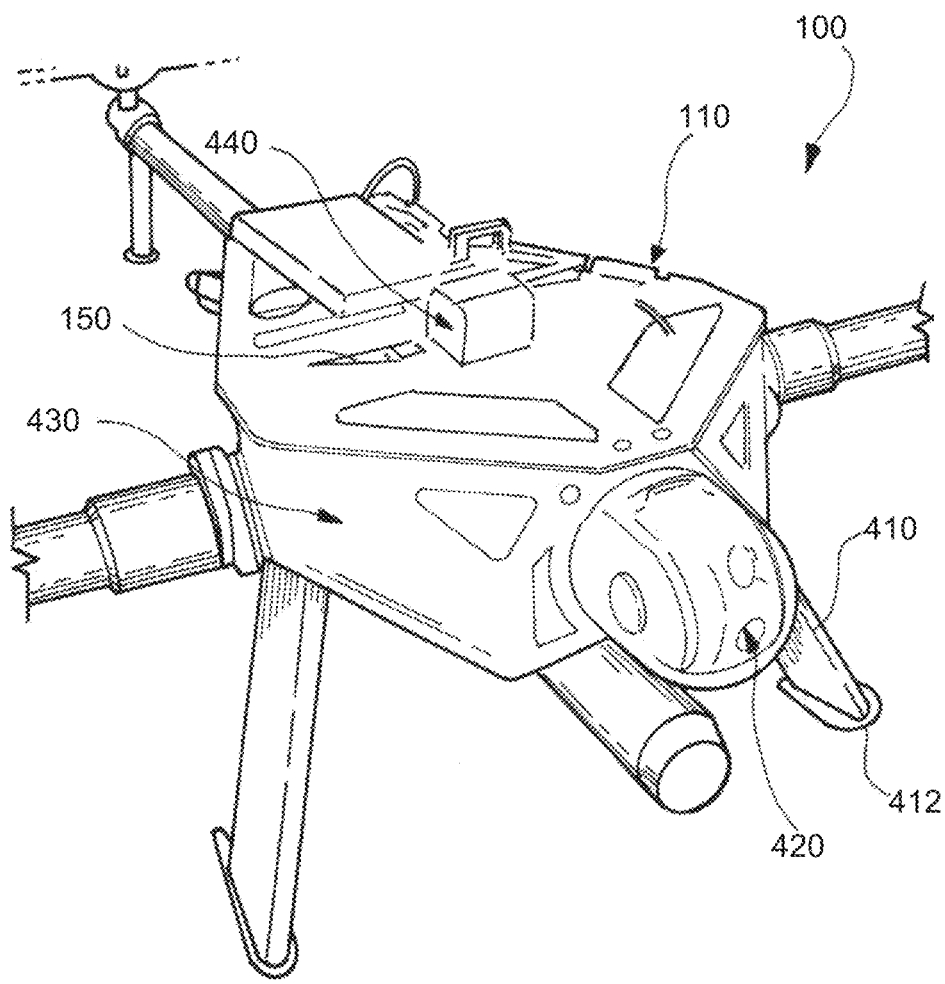
FIG. 4 shows a front perspective view of part of an armed UAV according to another embodiment of the present invention.

Referring to FIG. 4, in most embodiments, the UAV (100) includes three legs (410) extending downwards from the body (110) and an outer end of the arm member (132) of the tail rotor arm assembly (130) for supporting the UAV (100) when resting atop a support surface. Each leg (410) includes a foot (412) extending from an outer or distal end of the leg (410) for resting on the support surface.

Figure 5:
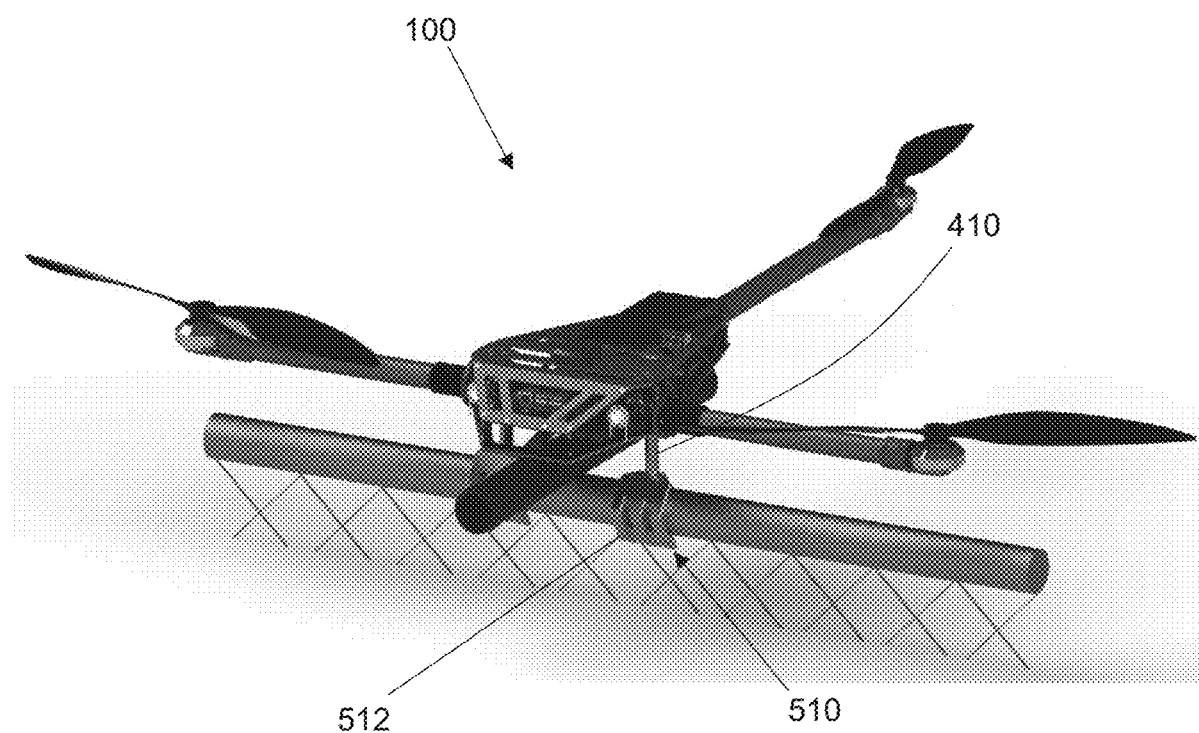
FIG. 5 shows an upper perspective view of an armed UAV according to another embodiment of the present invention.

Referring briefly to FIG. 5, in some embodiments, each leg (410) can include a foot clamp (510) for clamping about a support bar, such as, e.g., a fence railing.

The foot clamp (510) includes a pair of opposed clamping members (512) configured to be moved together and apart to clamp and release a support bar. The clamping members (512) are moved together and apart from one another by a selectively contolled electromechanical solenoid.

Referring back to FIG. 4, the UAV (100) further includes a camera (420) for capturing imaging data for display on an associated remote controller (to be described later).

The camera (420) is capable of capturing image and/or video data, infrared imagery and/or night vision imagery. As shown in this embodiment, the camera (420) is mounted to the body (110) via a gimbal mechanism to at least partially insulate and/or stabilise the camera (420) from noise of the UAV (100). The gimbal mechanism provides at least two degrees of freedom and includes one or more servomotors for controlling movement of the camera (420) relative to the UAV (100).

As also shown in this embodiment, the UAV (100) includes a light emitting device (430) for at least partially illuminating a path of flight in front of the UAV (100). The light emitting device (430) is in the form of an LED.

The UAV (100) generally also includes a range finder (not shown) for determining a distance between the UAV (100) and a target, or an object of interest. The range finder is a laser range finder and is typically oriented in a forward facing direction substantially parallel with a longitudinal axis of the UAV (100).

The UAV (100) further includes global navigation satellite system ("GNSS") antenna (440) and at least one modem. The GNSS antenna (440) is configured to receive radio waves from artificial satellites for determining positional coordinates of the UAV (100). The UAV (100) further includes a GNSS receiver associated with the GNSS antenna (440) for receiving output from the antenna (440).

The flight and targeting controller (150) is configured to be in wireless communication with an external controller, such, as, e.g., a remote controller and/or a remotely accessible server, via the at least one modem for the transmission of data between the UAV (100) and the external controller, including image and positional data. The positional data may also include velocity and altitude data. The at least one modem can be a cellular modem or a radio modem.

Figure 6:
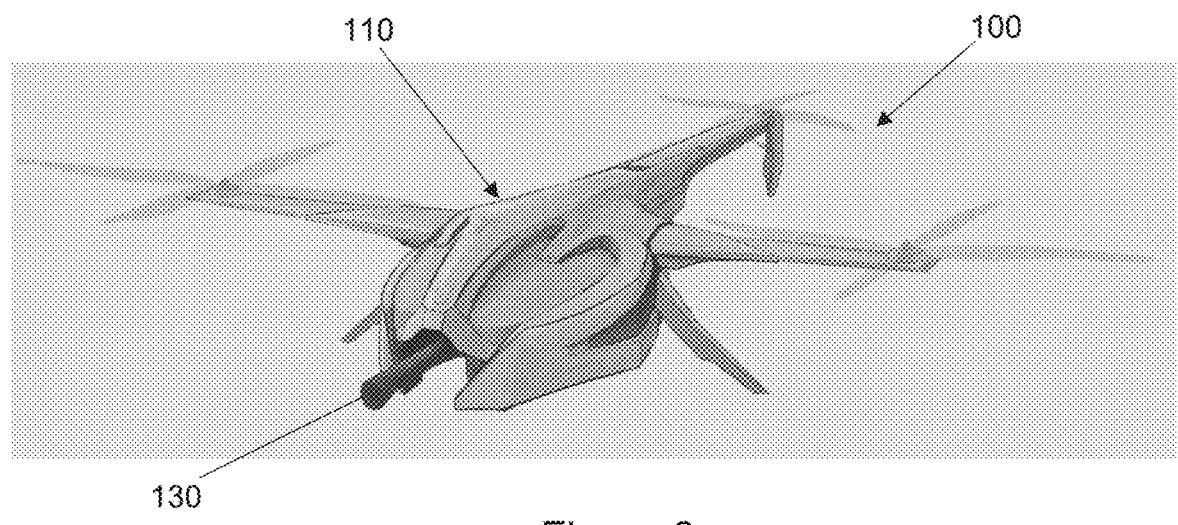
FIG. 6 shows an upper perspective view of an armed UAV according to another embodiment of the present invention.
Figure 7:
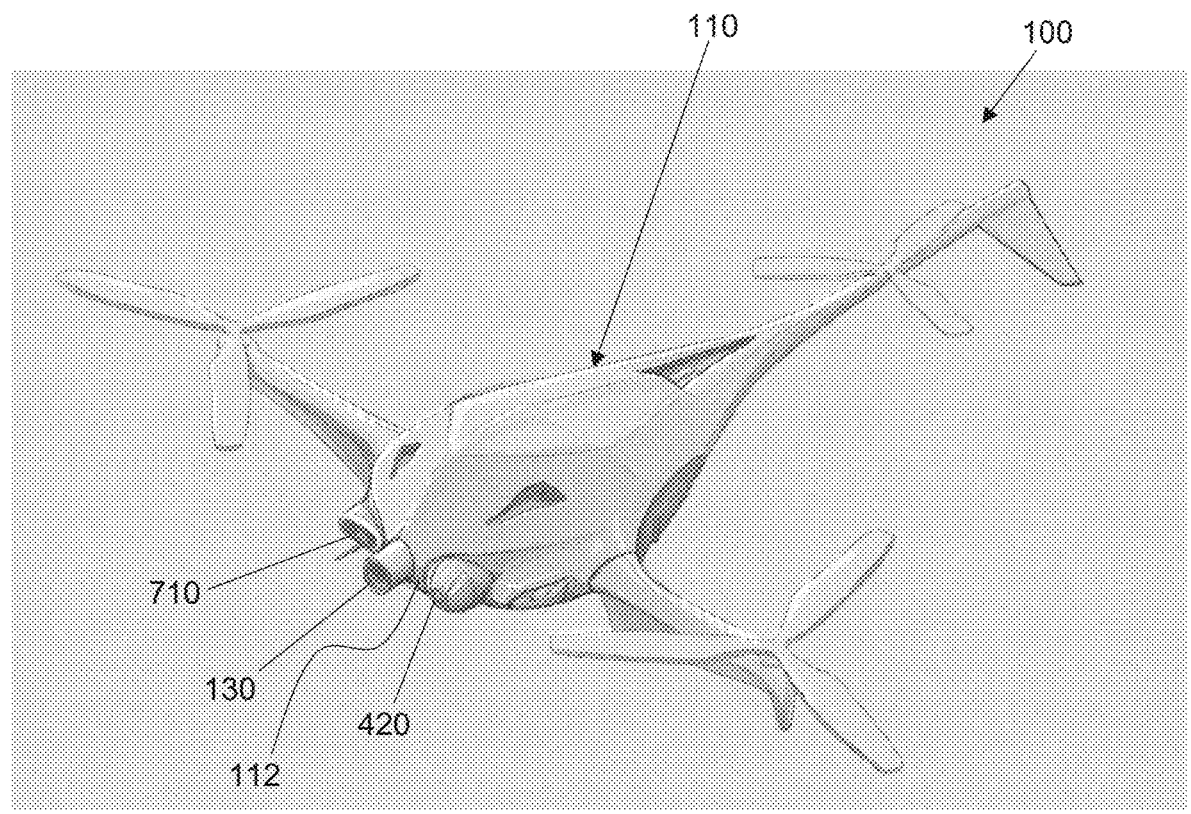
FIG. 7 shows an upper perspective view of an armed UAV according to another embodiment of the present invention.

Referring to FIGS. 6 and 7, these embodiments show a variation of the UAV (100) shown in the preceding figures in which the barrel (130) for deploying the projectile is integrally formed with the body (110) of the UAV (100). In such embodiments, the weapons system is aimed by aiming the UAV (100) at the target.

Specifically and in response to receiving target information about a target, the flight and targeting controller (150) is configured to determine a pitch angle and a yaw angle required to strike the target with the projectile and then selectively control operation of each said rotor arm assembly (120, 130) to aim the weapons system and the barrel (130) in particular at the target, based on the pitch angle and the yaw angle determined.

Referring to FIG. 7, in this embodiment, the barrel (130) is shown centrally located on the nose of the body (110) with the camera (420) being mounted to the nose (112) of the body (110) via a gimbal mechanism on one side of the barrel (130) and the range finder (710) being mounted to the nose (112) of the body (110) of the UAV (100) on an opposed other side of the barrel (130).

Figure 9:
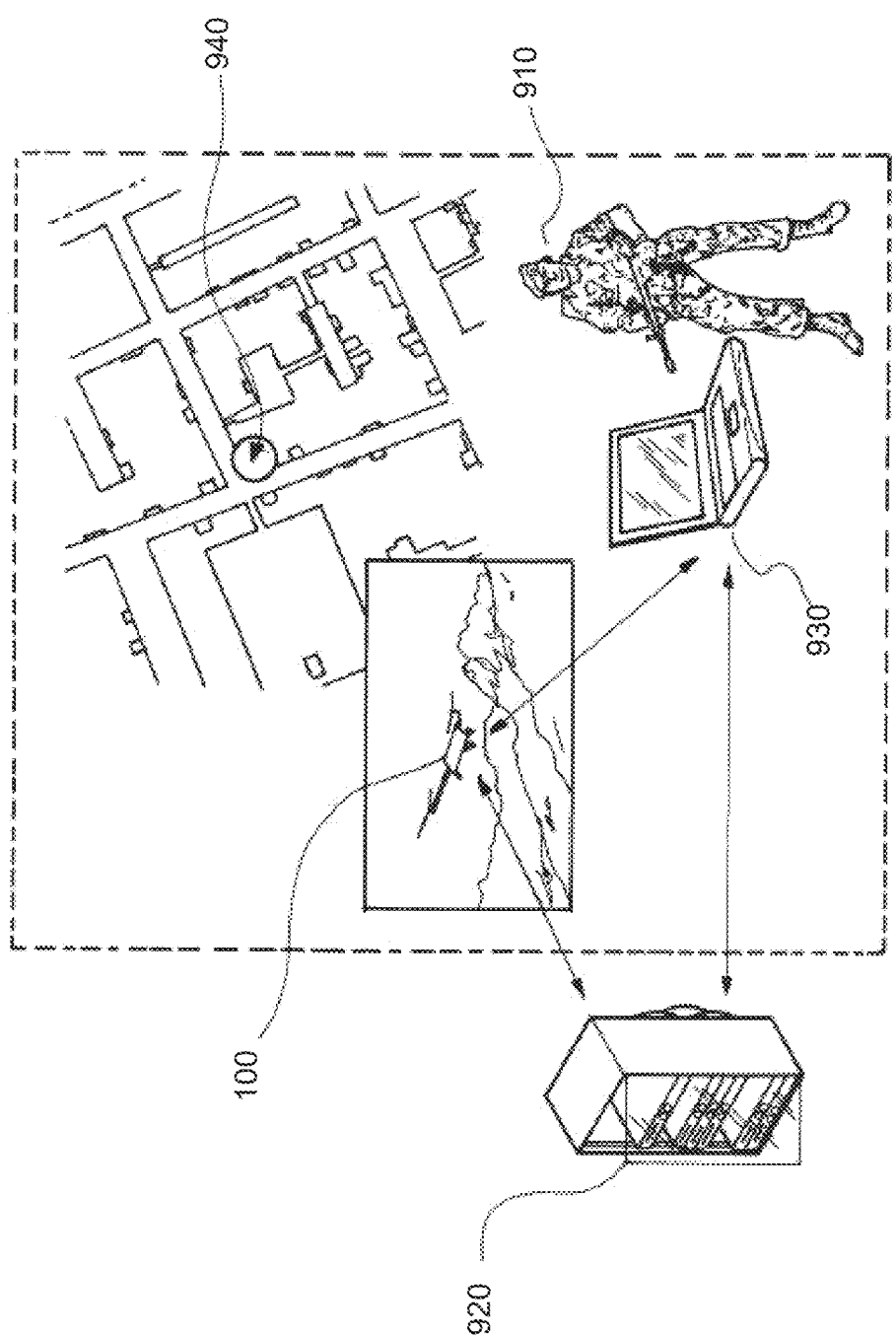
FIG. 9 is an illustration of an armed UAV control system according to an embodiment of the present invention.

FIG. 9 shows an armed UAV control system (900) according to an embodiment of the present invention for remote control of the UAV (100) by an operative (910).

The system (900) includes the armed UAV (100) as previously described; at least one remotely accessible server (920) in communication with the UAV; and a remote controller (930) in communication with the at least one remotely accessible server (920) and the UAV (100) for receiving and displaying at least positional and imaging data received from the UAV (100) and for transmitting commands to the UAV (100).

In some embodiments of the system (900), data may be transmitted directly between the UAV (100) and the remote controller (930). In other embodiments, data may be transmitted between the UAV (100) and the remote controller (930) via the at least one remotely accessible server (920).

The at least one remotely accessible server (920) can be any appropriate server computer, distributed server computer, cloud-based server computer, server computer cluster or the like. The server (920) includes one or more processors and one or more memory units containing executable instructions/software to be executed by the one or more processors.

The communications transmitted between the UAV (100) and the server (920) and/or the remote controller (930) include imaging data, positional, velocity and altitude data, target information data, and command data, including flight command data and weapons system command data.

Flight command data may include, but not be limited to, altitude, forward acceleration, rear acceleration, roll angle, pitch angle and/or yaw angle commands. Additionally, the flight command data may include selecting flight mode, i.e., hover mode, tilting hover mode and/or forward flight mode.

However, as indicated above, when not being operated by the remote controller (930), the UAV (100) can be operated with varying degrees of autonomy ranging from fully autonomous to intermittently autonomous via the on board flight and targeting controller (150; not shown).

Weapons system command data may include, but not be limited to, on/off; aiming the camera (420; not shown), aiming the range finder, aiming the at least one projectile and/or firing commands. Additionally, the weapons system command data can include selecting the at least one projectile and/or re-load commands.

As indicated, the flight and targeting controller (150; not shown) of the UAV (100) is configured to aim the UAV (100) and/or the weapons system in response to receiving target information data.

In some embodiments, the UAV (100) can autonomously collect the target information data, for example via the camera (420; not shown). In other embodiments, the target information data is provided by the remote controller (930). The target information data includes target type data, target location data, and/or armed status data, i.e., whether or not the target is armed.

The target type data includes whether the target is a live target, such as, e.g., a human or group of humans, or a non-live target, such as, e.g., a buildings or structure.

The target location data includes data as to the target's location relative to the UAV or relative to a common point, preferably in North east down ("NED") coordinates.

The armed status data includes information as to the type of weapon that the target is carrying, e.g., knife, gun, AK-47, M16, etc.

The remote controller (930) is in the form of a laptop computing device including a display for displaying imaging data, positional, velocity and altitude data, target information data, and command data, including flight command data and weapons system command data. The armed control system (900) includes software configured to be run on the laptop computing device and/or the remotely accessible server. The software is interactive and allows the operative (910) to interact and control the UAV (100).

Figure 10:
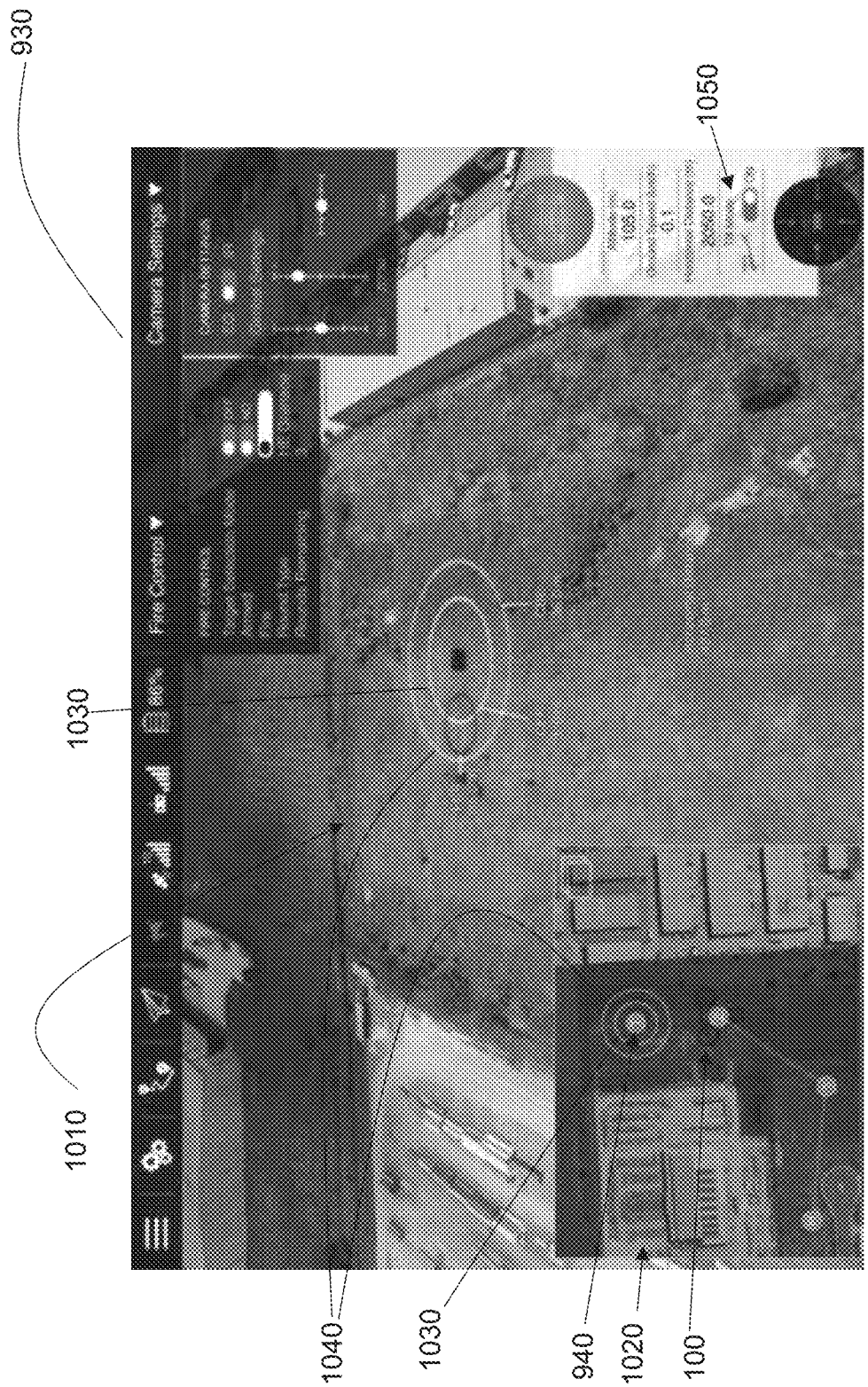
FIG. 10 is an illustration of a screen shot of software for controlling the system as shown in FIG. 9.

Referring briefly to FIG. 10, the software of the remote controller (930) can display imaging data (1010) collected by the camera (420; not shown) of the UAV (100; not shown) in real-time. The display can also display satellite image data (1020) annotated with a location of the UAV (100) and/or the target (940) as shown by the dot on the map in FIG. 9. In use, the operative (910; not shown) can interact with the data displayed to determine a distance between the UAV (100) and the target (940) or order the UAV (100) to determine the range to target with the range finder.

The image data of a target (940) displayed can also be annotated with target information data, such as, e.g., circular error probable ("CEP"; 1030), an effective firing range ("EFR"), an effective casualty radius ("ECR"), and/or a collateral damage estimation ("CDE"; 1040). Typically, such target information data is displayed when the operative (910; not shown) selects or clicks on the target (940) displayed.

The operative (910; not shown) can also interact with the data displayed on the display. For example, the operative (910; not shown) can pan, tilt, zoom the camera (420; not shown) of the UAV (100) to alter the data displayed.

The software also displays a representation (1050) of the UAV (100) annotated with an indication of the flight mode selected, including the pitch angle and the average deflection angle of the side rotors (126; not shown). A slider is provided with the representation, which the operative (910; not shown) can interact with to alter flight parameters of the UAV (100), such as, e.g., the pitch angle.

Referring back to FIG. 9, the remote controller (930) enables the operative (910) to toggle the weapons system of the UAV (100) between active and inactive modes.

The remote controller (930) enables the operative (910) to issue a fire command to the UAV (100), when the weapons system is active.

The remote controller (930) enables the operative (910) to select from a range of projectiles carried by the UAV (100).

The remote controller (930) enables the operative (910) to toggle between fight modes of the UAV (100).

Figure 11:
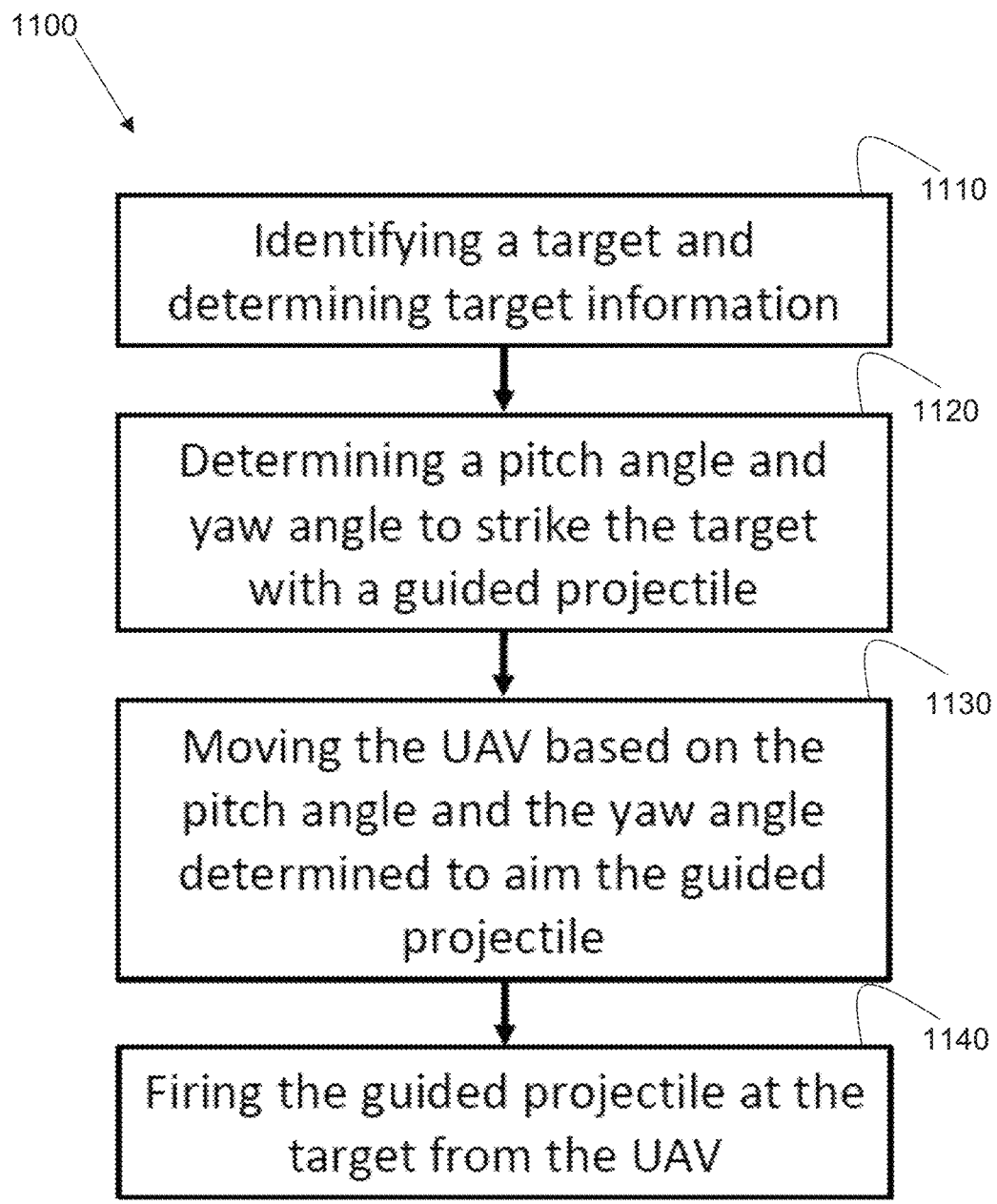
FIG. 11 is a flowchart showing steps in a method of the system as shown in FIG. 9.

A method (1100) of using the system (900) as shown in FIG. 9 is now described in detail with reference to FIG. 11.

At step 1110, the operative (910) identifies a target (940) and determines target information. The target (940) can be identified via the camera (420; not shown) of the UAV (100) or via an external source. Again, the target information can be supplied via the external source or can be determined by the UAV (100) capturing imaging data of the target (940). The target information includes at least a location of the target (940) relative to the UAV (100). This may be determined by positional data, such as, e.g., GNSS satellite imagery, or by a range finder carried by the UAV (100).

At step 1120, the flight and targeting controller (150; not shown) of the UAV (100), determines based on the target information determined, at least a pitch angle and yaw angle to strike the target (940) with a projectile carried by the UAV (100).

At step 1130, the UAV (100) moves based on the pitch angle and the yaw angle determined to aim the projectile at the target (940). In some embodiments, the flight and targeting controller (150; not shown) of the UAV (100) further moves the barrel (130; not visible) of the UAV (100) independent of the UAV (100) based on the pitch angle and the yaw angle determined to aim the projectile at the target (940).

At step 1140, the operative (910) transmits a firing command to the UAV (100) via the remote controller (930), which is transmitted either directly or via the remotely accessible server (920), to the UAV (100). Upon receiving the firing command, the flight and targeting controller (150; not shown) of the UAV (100) triggers a firing mechanism associated with the weapons system to trigger the deployment of the projectile at the target (940).

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An armed unmanned aerial vehicle ("UAV") comprising:

an elongate central body having a nose and an opposed tail aligned along a longitudinal axis;

a pair of opposed side rotor arm assemblies respectively extending from opposite sides of the central body about a pitch axis, each side rotor arm assembly being selectively rotatable relative to the central body about the pitch axis;

a tail rotor arm assembly extending from the tail of the central body along the longitudinal axis;

a weapons system comprising at least one projectile associated with the central body; and a flight and targeting controller operatively associated with the side rotor arm assemblies and the tail rotor arm assembly, said controller configured to:

responsive to receiving target information about a target, determine at least a pitch angle and a yaw angle required to strike the target with the weapons system; and selectively control operation of each said rotor arm assembly for aiming the weapons system, based on at least the pitch angle and the yaw angle determined.

2. The UAV of claim 1, wherein each said side rotor arm assembly is selectively rotatable relative to the central body over a range of at least 90° about the pitch axis.

3. The UAV of claim 1, wherein each said side rotor arm assembly is selectively rotatable between a hover position in which an associated rotor is substantially horizontally oriented and a forward-facing position in which the associated rotor is substantially vertically oriented.

4. The UAV of claim 1, wherein selective rotation of each of said side rotor arm assembly enables the UAV to transition between three flight modes, comprising a hover mode, a tilting hover mode and a forward flight mode.

5. The UAV of claim 1, wherein the weapons system comprises at least one barrel for guiding deployment of the at least one projectile.

6. The UAV of claim 5, wherein the at least one barrel is pivotally mountable to the UAV by a barrel mount.

7. The UAV of claim 1, wherein the at least one projectile consists of a bullet, a shell, a grenade or any other man-portable micro-munition.

8. The UAV of claim 1, wherein the at least one projectile comprises a non-lethal projectile.

9. The UAV of claim 6, wherein responsive to receiving the target information, the flight and targeting controller further determines a barrel pitch angel and a barrel yaw angle and then selective controls operation of the barrel mount for aiming the at least one barrel independent of the UAV based on the barrel pitch angle and the barrel yaw angle determined.

10. The UAV of claim 1, wherein the target information received by the flight and targeting controller is selected from target type, target location and whether the target is armed.

11. The UAV of claim 1, wherein responsive to receiving the target information, the flight and targeting controller further determines an effective firing range ("EFR") for the at least one projectile if deployed at the target.

12. The UAV of claim 1, wherein the flight and targeting controller further determines an estimate of circular error probable ("CEP") for the at least one projectile if deployed at the target based on the UAV's current position, comprising altitude.

13. The UAV of claim 1, wherein the flight and targeting controller further determines an effective casualty radius ("ECR") for the at least one projectile if deployed at the target based on the UAV's current position, comprising altitude.

14. The UAV of claim 1, wherein the flight and targeting controller further determines a collateral damage estimation ("CDE") for the at least one projectile if deployed at the target based on the UAV's current position, comprising altitude.

15. The UAV of claim 1, wherein the flight and targeting controller is further configured to selectively control each said side rotor arm assembly responsive to receiving external commands for directing a flight path of the UAV, comprising switching between flight modes.

16. An armed UAV control system, comprising:
the armed UAV of claim 1;
at least one remotely accessible server in communication with the armed UAV; and
a remote controller in communication with the UAV and/or the at least one remotely accessible server for receiving and displaying at least positional and imaging data received from the UAV and for transmitting commands to the UAV.

17. The armed UAV control system of claim 16, wherein the remote controller comprises a display for displaying image data and positional, velocity and altitude data transmitted by the UAV in real-time.

18. The armed UAV control system of claim 16, wherein the remote controller enables a user to toggle the weapons system of the UAV between active and inactive modes.

19. The armed UAV control system of claim 16, wherein the remote controller enables a user to issue a fire command to the UAV.

20. A method of firing a projectile from an armed UAV, said method comprising:
providing the armed UAV of claim 1;
identifying a target and determining target information;
based on said target information, determining at least a pitch angle and yaw angle required to strike the target with the projectile;
moving the UAV, based at least on the pitch angle and the yaw angle determined, to at least partially aim the UAV; and
firing the at least one projectile at the target from the UAV.

* * * * *